United States Patent [19]

Le Nay et al.

[11] E Patent Number: Re. 32,468

[45] Reissued Date of Patent: Aug. 4, 1987

[54] CENTRAL STATION ALARM

[75] Inventors: Tom W. Le Nay, Encino; Donald L. Hadden, Fountain Valley; George S. Beckwith, Sherman Oaks, all of Calif.

[73] Assignee: Baker Protective Services, Inc., Parsippany, N.J.

[21] Appl. No.: 700,778

[22] Filed: Feb. 12, 1985

Related U.S. Patent Documents

Reissue of:

[64] Patent No.: 4,228,424
Issued: Oct. 14, 1980
Appl. No.: 951,958
Filed: Oct. 16, 1978

[51] Int. Cl.[4] ..... G08B 26/00

[52] U.S. Cl. ..... 340/506; 340/505; 340/518; 379/49

[58] Field of Search ..... 340/505, 506, 507, 510, 340/521, 531, 533, 539, 825.5, 825.22, 825.7, 365 R; 179/5 R, 1 P

[56] References Cited

U.S. PATENT DOCUMENTS

| | | | |
|---|---|---|---|
| 3,713,142 | 1/1973 | Getchell | 340/505 |
| 3,714,646 | 1/1973 | Nurnberg et al. | 340/517 |
| 3,792,469 | 2/1974 | McLean et al. . | |
| 3,792,470 | 2/1974 | Donovan et al. | 340/533 |
| 3,858,194 | 12/1974 | Jedynak et al. | 340/528 |
| 3,990,075 | 11/1976 | Schmitz et al.340 | 533/ |
| 4,023,139 | 5/1977 | Samburg . | |
| 4,025,905 | 5/1977 | Gorgens . | |
| 4,044,351 | 8/1977 | Everson | 340/505 |
| 4,056,684 | 11/1977 | Lindstrom | 179/5 R |
| 4,060,803 | 11/1977 | Ashworth | 340/506 |
| 4,162,488 | 7/1979 | Silverman et al. | 340/505 |
| 4,174,517 | 11/1979 | Mandel | 340/310 A |
| 4,183,085 | 1/1980 | Roberts et al. | 364/200 MS |
| 4,184,200 | 1/1980 | Wagner et al. | 364/200 MS |
| 4,189,719 | 2/1980 | Massa et al. | 340/501 |
| 4,206,450 | 6/1980 | Harden et al. | 340/521 |
| 4,262,283 | 4/1981 | Chamberlain et al. | 340/533 |
| 4,465,904 | 8/1984 | Gottsegen et al. | 340/518 |

FOREIGN PATENT DOCUMENTS

| | | |
|---|---|---|
| 1294232 | 10/1972 | United Kingdom . |
| 1334061 | 10/1973 | United Kingdom . |
| 1374711 | 11/1974 | United Kingdom . |
| 1505718 | 3/1978 | United Kingdom . |
| 1510519 | 5/1978 | United Kingdom . |
| 1526869 | 10/1978 | United Kingdom . |

OTHER PUBLICATIONS

Hendriks, "Beveiliging Per Computer" (Security by Computer) Electrotechniek/Elektronica, vol. 30, No. 20, pp. 687-693 (1975).

*Primary Examiner*—Donnie L. Crosland
*Attorney, Agent, or Firm*—Pennie & Edmonds

[57] ABSTRACT

A plurality of remotely located transponder units each communicate with a central station unit to provide a full array of alarm and status signals to the central station. The transponder units are capable of remotely addressing the central station unit directly, without the need for human intervention at the central station, to alter subscriber opening and closing times, passwords, and other system parameters. The transponder also permits defective zones to be shunted either from the central station or locally pending repair, testing and status checks.

21 Claims, 10 Drawing Figures

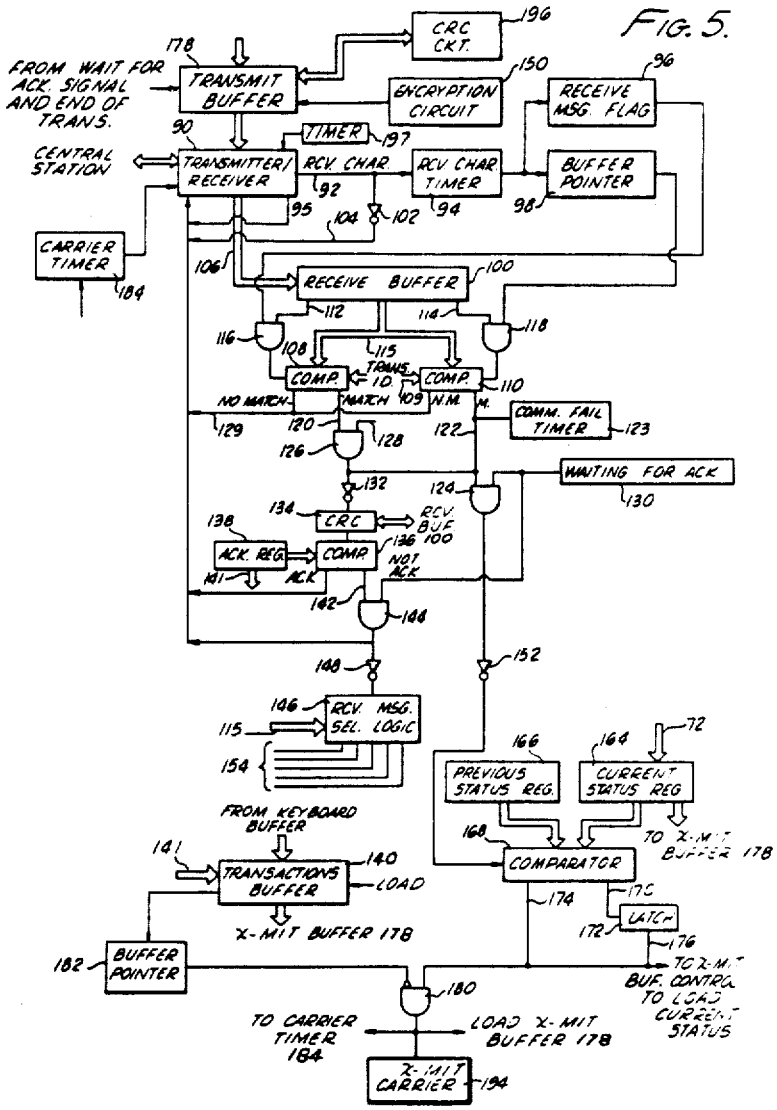
FIG. 5.
CRC CKT.
196
178
FROM WAIT FOR ACK. SIGNAL AND END OF TRANS.
TRANSMIT BUFFER
ENCRYPTION CIRCUIT
150
96
RECEIVE MSG. FLAG
90
TIMER
197
CENTRAL STATION
TRANSMITTER/ RECEIVER
RCV. CHAR.
RCV. CHAR. TIMER
BUFFER POINTER
92
94
98
95
104
102
CARRIER TIMER
184
106
RECEIVE BUFFER
100
112
114
116
118
108
115
COMP.
TRANS. ID.
COMP.
110
NO MATCH
MATCH
109
N.M.
M.
COMM. FAIL TIMER
123
129
120
122
126
128
WAITING FOR ACK
130
132
124
134
CRC
RCV. BUF 100
138
ACK. REG.
COMP.
136
NOT ACK.
141
ACK
142
144
148
152
146
RCV. MSG. SEL. LOGIC
115
154
166
164
72
PREVIOUS STATUS REG.
CURRENT STATUS REG
FROM KEYBOARD BUFFER
168
TO X-MIT BUFFER 178
141
TRANSACTIONS BUFFER
140
LOAD
COMPARATOR
174
176
LATCH
172
X-MIT BUFFER 178
176
182
BUFFER POINTER
TO X-MIT BUF. CONTROL TO LOAD CURRENT STATUS
180
TO CARRIER TIMER 184
LOAD X-MIT BUFFER 178
X-MIT CARRIER
194

CENTRAL STATION ALARM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to burglar alarm and alarm systems, and relates more particularly to central station alarm systems.

2. Description of the Prior Art

Central station alarm systems are known in the art, and provide a plurality of sensing units located within their respective protected areas such as stores, banks and the like and all in communication with a central station which monitors the activities of each sensing unit during prescribed periods. The prescribed periods during which the activities of each sensing unit are monitored are typically dictated by the user, and may be considered as generally reflecting the hours of operation of the protected business.

The prescribed periods of protection are conventionally entered into a central processing device which may include a computer or similar high-level monitor. Examples of such systems are Hewitt et al U.S. Pat. No. 4,006,460 and Atkinson U.S. Pat. No. 3,697,984. Other more basic alarm systems are shown by Goldsby et al U.S. Pat. No. 3,858,181; Gall U.S. Pat. No. 3,943,492; Klein et al U.S. Pat. No. 3,803,594; Donovan U.S. Pat. No. 3,792,470; Lee U.S. Pat. No. 3,626,098; and Williams U.S. Pat. No. 3,340,362.

It has also been known in the art to employ a processing device at both the central station and each remote installation, as suggested by Wadhwani et al U.S. Pat. No. 3,925,763 and Bridge et al U.S. Pat. No. 3,454,936. Typically these satellite processing devices provide only very limited capabilities such as calling programs from the central station or encoding messages for transmission to the central station. Similarly limited functions of the remote unit are also shown in Woodward et al U.S. Pat. No. 3,839,707, which employs microprocessors at both the central and satellite stations. Bickel et al U.S. Pat. No. 3,883,695 likewise shows the use of a PROM in a satellite station, although only in combination with a timing control circuit.

Numerous difficulties have been encountered with systems of the type discussed above. Foremost among these has been the difficulty in altering the opening and closing times for a given protected area. Conventionally, and as noted above, only the central station has been able to alter the times at which the alarm system begins and ends monitoring a specific protected area. These start/stop times are generally programmed in the central station device, so that a subscriber must telephone or otherwise contact an operator at the central station each time a different start or stop time is desired. Because of the inherent error factors, and wasted time, involved in such a convoluted communications loop, such alarm systems have been unsatisfactory.

Previous systems also encountered difficulties in the event of equipment failures. In prior art systems, no means was available by which an improperly operating detection zone or device could be overriden by the user. Rather, a serviceman was required to come to the monitored location to shunt the device until repairs or other services could be made. This required additional down time of the other, properly operating detection zones, in addition to being a considerable inconvenience to the user. Thus there has been a need for a remotely accessible alarm system suitable for use as a central station device.

SUMMARY OF THE INVENTION

The present invention substantially improves on the aforementioned difficulties encountered with prior art systems, in addition to providing numerous other advantages. In one embodiment, the central station unit comprises a processor which communicates via telephone lines with a plurality of remotely located subscriber transponder units in either an "open window" or "closed window" transmission configuration. Each transponder unit includes an input device such as a keyboard together with a sequencing unit and a plurality of data storage locations. The transponder is internally synchronous but operates asynchronously of the central station unit, with which it communicates by conventional transmitter/receiver circuitry. The central station unit may communicate with the transponder in a like manner and polls or enquires into the status of each of the transponder units in turn.

Associated with each transponder unit are a plurality of monitored zones of a conventional nature, such as burglary sensors, fire alarms, hold-up alarm, and similar conventional alarm inputs. The transponder unit synchronously scans the status of the zone inputs and, when an alarm condition is detected, communicates the same to the central station unit on the next poll of the particular transponder unit by the central station. In this manner, all conventional modes of protection are provided.

Additionally, the system of the present invention provides exceptional flexibility for the subscriber. As pointed out previously, conventional central station alarm systems have required substantial voice telephone communications between the subscriber and the central station personnel to permit any alteration in opening or closing times, unscheduled openings, changes in schedules, or designations of authorized personnel.

In the present invention, each of these changes may be entered directly into the transponder unit via the keyboard or other input peripheral, and will then be communicated to the central station processor. Thus, virtually all voice communication with the central station operator is eliminated with the present invention. This avoids the possibility of central station operator error during periods of high density communication such as conventional opening or closing times for various stores or offices. Error detection means are provided to ensure that any changes entered by the subscriber or his designated personnel are properly entered and affect only the particular subscriber. In addition, a special code may be provided to indicate a forced use of the system, or an ambush.

In addition to the foregoing, the system of the present invention permits the central station to remotely turn on the subscriber unit, in the event that the subscriber forgets or otherwise fails to turn the system on. Also, the central station unit, via its communication link with the transponder unit, signals the subscriber at the closing time, thus providing a reminder to enter any temporary schedule changes. Other features of the present invention include means for permitting either the subscriber or the central station to shunt a defective zone pending repair. This permits the remainder of the premises to be protected even in the event of trouble on one or more individual zones. Also, the shunt may be automatically cleared at the next time the premises are opened. Circuitry is also provided to ensure that the individual shunting the zone, or performing any other change of system parameters, is authorized to do so. Also, because the transponder unit is substantially self-contained and operates asynchronously of the central station unit, the transponder can be turned on to provide a local alarm even when communication has been disabled with the central station. Thus, numerous levels of protection are provided, allowing for diverse emergency situations.

It is therefore one object of the present invention to provide an improved central station alarm system.

It is another object of the present invention to provide an improved local alarm system.

It is a still further object of the present invention to provide an improved subscriber transponder unit for communication with a central station unit.

It is a further object of the present invention to provide an alarm system in which voice communication with a central station operator is substantially eliminated.

It is a further object of the present invention to provide an improved alarm system in which a subscriber unit may be remotely activated.

It is a still further object of the present invention to provide an alarm system in which passwords of authorized personnel may be changed and stored at the central station without assistance of central station personnel.

These and other features of the present invention may be better appreciated from the following detailed description, in which FIG. 1 schematically illustrates a central station alarm system network;

FIG. 2 schematically illustrates a central station unit;

FIG. 5 depicts in schematic form transponder circuitry for bidirectionally communicating with the central station;

DETAILED DESCRIPTION OF THE INVENTION

Figure 1:
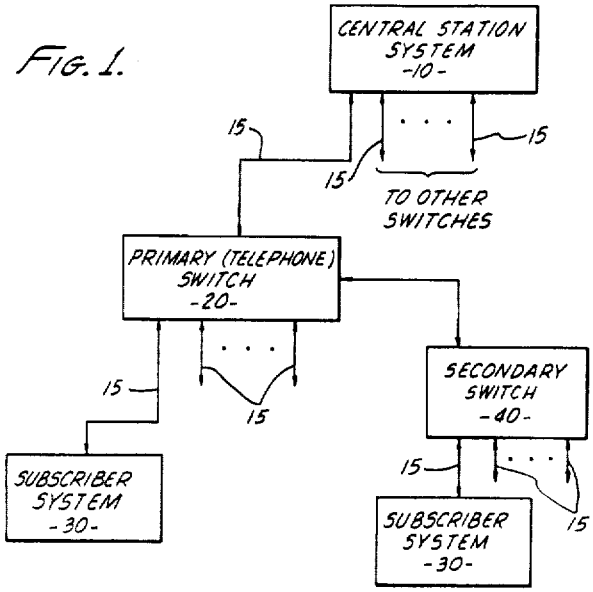

Referring first to FIG. 1, a central station system designated 10 is connected via a plurality of telephone lines 15 or other suitable communications links through a plurality of switching devices 20 to a plurality of subscriber systems 30. Additionally, a secondary switch 40 may be used in combination with the primary switch 20 to provide additional fan-out. Also, some of the telephone lines 15 communicating directly with the central station system 10 may be implemented as "open window" systems, thus obviating the need either for primary switch 20 or a secondary switch 40.

During operation, the central station system 10 sequentially polls the status of each of the subscriber systems 30 through a time multiplexing system. Each subscriber system, which operates synchronously internally but asynchronously of the central station system 10, is identified by a unique code, which prevents communications errors and unauthorized entry into a particular system. During operation, each subscriber system 30 includes a plurality of monitored zones, or alarm inputs. The subscriber system 30 periodically, on the order of every twenty milliseconds, scans the alarm inputs. In the event of an emergency, the appropriate alarm input is triggered and registered by the subscriber system, and readied for transmission to the central station unit 10. Shortly thereafter, the central unit will poll the subscriber system; that is, the central station system 10 will enquire as to the status of the subscriber system 30. The alarm status is transmitted to the central station for subsequent operation. The alarm is then displayed by the central system in a conventional manner. The subscriber system 30 also includes a keyboard or other input device as will better be appreciated from FIG. 3. By means of the input device, the subscriber is permitted to alter many of the operating parameters of the system, both locally and at the central station, by communicating these changes to the central station in response to a poll therefrom.

Figure 2:
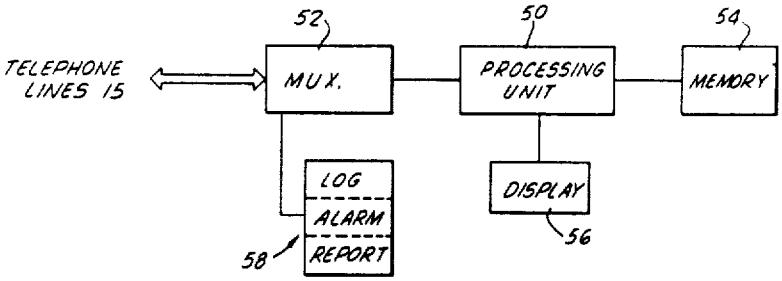

The central station system 10 is shown in greater detail in schematic form in FIG. 2. A processing unit 50 communicates through a MODEM and multiplexing circuit 52 and telephone lines 15 to the subscriber system as shown in FIG. 1. A memory device 54 such as a RAM together with other memory provides storage of the system status and other inputs. A display and input circuit 56 communicates bi-directionally with the processing unit 50 to permit the central station operator to make authorized changes and to interrogate the system. A typical input system may involve a keyboard as well as other input devices.

The display portion of the circuit 56 provides immediate readout of alarm conditions as well as system status, and may include a plurality of paper tape printers as well as a CRT display. System readouts may be provided by a printer array 58 which receives communications from the processing unit 50 and provides log, alarm and report status. Although not shown in FIG. 2, a central station unit typically includes a duplicate of each of the above-described portions of the system, all communicating through the same telephone lines 15. This redundancy is provided to ensure a fail-safe operation. As will be better appreciated hereinafter, even if communication is lost between the central station system 10 and the subscriber system 30, the autonomous operating capability of the subscriber system permits at least local alarm protection.

Figure 3:
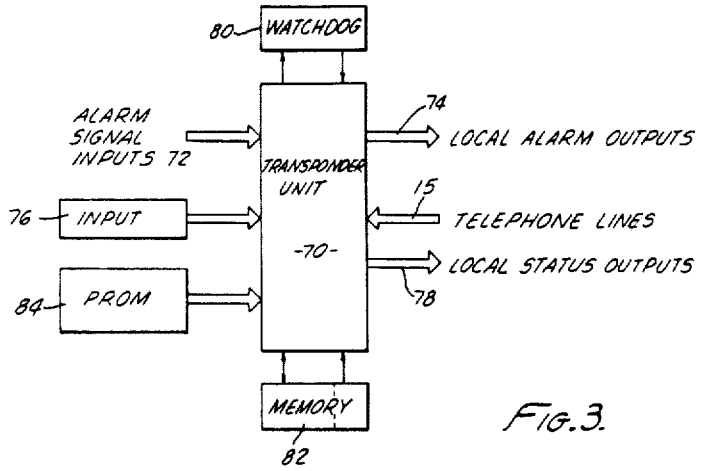
FIG. 3 illustrates in schematic form a subscriber transponder unit.

Referring next to FIG. 3, the subscriber system 30 is shown in schematic form in greater detail than FIG. 1. More particularly, a transponder unit 70 synchronously receives alarm signal or zone inputs 72 which it then processes, and, if necessary, communicates to the central station unit over telephone lines 15 as discussed previously. Local alarm outputs are provided on lines 74 to suitable devices such as sounders, lights, buzzers or the like.

An input device 76, such as a keyboard, provides a communications link between the subscriber and the transponder unit. This permits the subscriber to modify, add, delete, or otherwise change many of the operating parameters of the system, as will be better described hereinafter. The input device 76 also permits the subscriber to turn the system, or any portion thereof, on or off as necessary to provide protection. Local status outputs may be provided on lines 78 to indicate the operating condition of the system. A watchdog timer 80 may also be provided to ensure continuous synchronous operation of the system as will be discussed hereinafter.

A memory device 82, such as a plurality of registers, a RAM in combination with a ROM, or other suitable memory device is also associated with the transponder unit 70. The memory 82 stores the processing variables from the transponder 70 pending subsequent processing and communication to the central station. The memory 82 also stores the passwords accepted for use in the system, and also stores standard messages for communication to the central station. However, a master password is stored in a second memory device 84, which is preferably PROM, but may be implemented as a plurality of registers or other memory devices.

The PROM 84 is uniquely configured for each subscriber and permits the subscriber to specify many of the system variables to suit his particular needs. Among the items which may be specified for storage in the PROM 84 are the master password, the time delay (after AC power failure before the system indicates an alarm), entrance delay, exit delay, additional entrance delay (if any) and the time therefor, auto reset of a burglary bell, which password levels have shunt control, whether the central station shall have shunt control, existence of an ambush password, fire bell time, whether entry of a password is required to test or close the system, whether the sounder should operate during entrance delay, and which passwords will have schedule change capability and closing time capability. Thus it can be seen that the PROM 84, in combination with the transponder unit 70, and other associated components, provides substantial flexibility for the subscriber.

During operation, the transponder unit 70 synchronously scans the array of alarm signal inputs 72, typically cycling approximately every twenty milliseconds. As noted above, if an alarm condition is detected, the signal is processed to provide the appropriate message to the central station unit 10 via the telephone lines 15. However, communication to the central station unit is only available in response to a poll from the central station unit, which typically occurs every few seconds. As will be described hereinafter, if no alarm conditions are detected, the transponder unit 70 replies to a poll from the central station with a simple acknowledge.

In normal operation, one input to the transponder unit 70 will come from the keyboard 76, in the form of a subscriber-initiated transaction. Thus, the subscriber may wish to add or delete a password (other than the master password), may turn the system on or off, may shunt or subsequently clear a zone input, may provide for an irregular opening, or extended closing time, or make a change in schedule. To perform any of the above transactions, the subscriber keys in the necessary message, which is then processed by the transponder unit and communicated as a transaction to the central station unit during the next poll of the transponder unit 70.

To perform any of the foregoing transactions, it is important that security be maintained and thus each transaction message typically begins with the password of the individual requesting the transaction. As noted previously, individuals authorized by the subscriber to operate the system are designated by passwords, and further designated by a "man number" associated with a particular password. To further ensure security, transactions involving the use of passwords are transmitted in encrypted form to the central station unit, where the transaction type is indicated, together with the man number of the individual requesting the transaction. The password of the individual is not shown to provide enhanced security.

Following the entry of the password, a typical transaction input from the keyboard 76 includes a character string for indicating the type of transaction, followed by the substantive message, which may be a variable length character string involving a plurality of message fields. A sample message format is shown below for a schedule change transaction:

(PASSWORD)*(TIME)*(O)*(P)*D*HHMM (AM)
(C) (T) (PM)

Thus it can be seen that the first entry is the password, followed by the transaction code (TIME) followed by a designator to determine whether the time being changed is opening (O) or closing (C), followed by a second designator to indicate whether the change is permanent (P) or temporary (T). This is followed by the day of the week (D), followed by the hours (HH) and the minutes (MM), and finally followed by AM or PM designations. The asterisks serve to separate the fields of the message.

Figure 4:
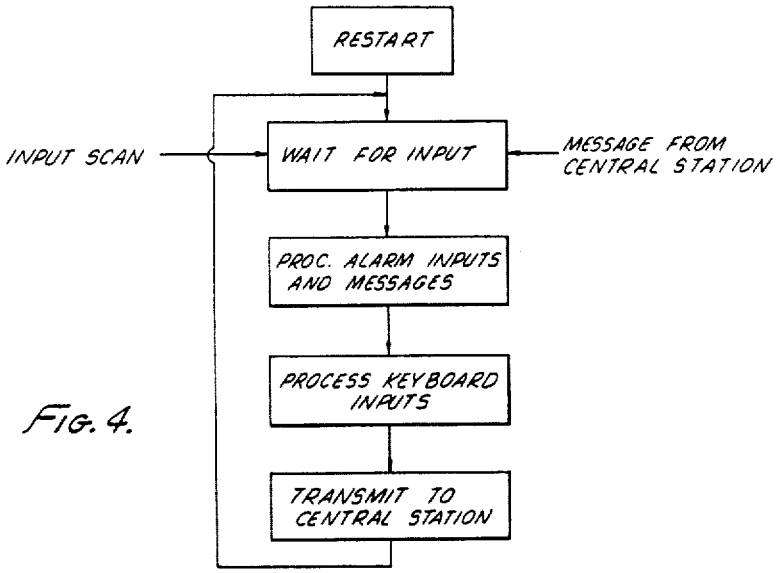
FIG. 4 illustrates in flow diagram form the processing sequence of the transponder unit.

The operation of the transponder unit 70 can also be appreciated from FIG. 4, which demonstrates in flow diagram form the sequencing of the transponder unit. The transponder is started initially by a restart signal, which is typically applied by the power on switch and causes the registers to initialize in a known state. A restart should be required only when power is removed. Once the transponder unit 70 has been initialized, the next step in the sequence is to determine whether an input has been received, either from the zone inputs 72 or the keyboard 76. Also, a message may be received from the central station system 10. Thereafter the alarm inputs, if any, are processed, followed by processing of any keyboard inputs, or transactions.

Messages from the central station are processed in the same manner as the alarm inputs. Once the processing of the inputs has been completed, messages to be transmitted to the central station are formatted and communicated thereto. The process then repeats by again checking for inputs. As can be appreciated from the foregoing disclosure, the present invention is particularly suited to implementation with a microprocessor, together with the peripherals indicated in FIG. 3. To this end, attached hereto as Appendix A are a complete set of flow diagrams for a microprocessor implementation. The present invention is also suitable for implementation in a dedicated embodiment, which will be described hereinafter.

Turning now to FIG. 5, illustrated therein in schematic, block diagram form is transponder circuitry for receiving communications from the central station and for transmitting communications thereto. The most common communication from the central station will be a poll signal which is received by a transmitter/-receiver 90 via the telephone lines 15. The transmitter/-receiver 90 is typically an asynchronous transceiver such as an ACIA, or asynchronous communications interface adapter, but either synchronous or asynchronous communications are acceptable. If a character, or the first part of a message, has been received, a signal is provided on line 92 which initializes a receive character timer 94. The receive character timer is set to time out after a complete message, comprising a character string, has been received. Also, when a character marking the beginning of a message is received, the transmitter/-receiver 90 generates an interrupt on a line 95 to maintain the receiver 90 in that mode until the last of the message has been received. The interrupt line 95 operates in a similar manner for transmissions.

When the receiver character timer 94 times out, a receive message flag 96 is set and a receiver buffer pointer 98 is stepped to the next count. The buffer pointer 98 typically will comprise a counter, or a register in the memory 82 (FIG. 3) if a microprocessor implementation is preferred, matched to a number of locations in a receive buffer 100 described in greater detail hereinafter. Since the transmitter/receiver 90 is caused to operate asynchronously only in the event of a transmission or receipt of a message, in most cases the signal on line 92 will be inactive. This inactive condition returns control to the transmitter via the line 104, by means of an inverter 102, for sequencing to the next portion of the process in FIG. 4.

However, when a message has been received, the character is placed into the receive buffer 100 via a data path 106.

The first character received as part of of a message will preferably be a transponder ID, which will be compared with the transponder ID, typically stored in the PROM 84 (FIG. 3). The transponder ID is supplied to a pair of comparators 108 and 110 via a data path 109. If the character which has been received is the first character of the message, a signal will appear on each of lines 112 and 114 from the receive buffer, which respectively will provide one input to an AND gate 116 and an AND gate 118. The remaining input to the AND gate 116 will be provided by the received message flag 96, while the remaining input to the AND gate 118 will be provided by the buffer pointer 98 when the buffer pointer indicates that a first character has been received.

The AND gate 116 then provides a control signal to the comparator 108, while the AND gate 118 performs a similar function for the comparator 110. In this manner the character received in the receive buffer 100 is compared with the stored transponder ID. If a match occurs, as evidenced by a signal on lines 120 and 122, respectively, a communications fail timer 123 is initialized and an input is provided on the line 122 to another AND gate 124. A match signal from the comparator 108 is provided to an AND gate 126, the remaining input of which is provided on a line 128 from the buffer pointer 98, and indicates the receipt of an ID message only. If no match is indicated by a signal on the line 129, control is returned to the transmitter/receiver for turn-off and return of the transponder unit to normal operation.

For the exemplary system described here, if the substance of the message received from the central station is the transponder ID only, the message is a poll of the transponder unit 70. It is to be understood that a wide range of messages could be used in a particular system to perform the polling function described here. The transponder unit 70 responds to a poll by providing the central station unit with any alarm status inputs or transaction inputs which have been generated by the transponder unit as described hereinafter. If the waiting for acknowledge latch or flag 130 is set, which provides an input to AND gate 124, the output of AND gate 126 is OR'd with the output of the comparator 110 to provide the remaining input to the AND gate 124 as described above.

In the event that the message received is other than an ID only, the input of the AND gate 126 will be false, which will be inverted by a gate 132. The output of the inverter 132 actuates a cyclic redundancy character (CRC) circuit indicated at 134. The CRC circuit 134 communicates with the receive buffer 100 to determine that the characters of the received message are correct. If the CRC circuit 134 provides an affirmative response, a signal is generated which is provided to a comparator 136. The comparator 136 compares a stored acknowledge signal provided by an acknowledge register 138, which may be part of the PROM 84, with the received message stored in the receive buffer 100 to determine whether the message received is merely an acknowledge from the central station. Such an acknowledge would indicate that the central station has received a past communication from the transponder unit. In the event that the message is merely an acknowledge, control is returned to the transmitter/receiver 90, just as would be done if the comparators 108 and 110 indicated that the received and transponder IDs were not a match.

However, if the message identified by the comparator 136 is not an acknowledge, the acknowledge signal from the register 138 is caused to be loaded in a transactions buffer 140 via a line 141. A line 142 from the comparator 136 also provides one input to an AND gate 144 which receives its remaining input from the waiting for acknowledge flag 130. If the output of the AND gate 144 is true, the transmitter is enabled and the acknowledge signal in the transaction buffer is communicated to the central station. However, if the transponder unit is not waiting for acknowledge and the flag 130 is not set, the output of the AND gate 144 is false, which actuates a receive message select logic circuit 146 via an inverter 148, and one of the lines 154 is enabled to cause the received message to be processed.

The receive message select logic circuit interprets the message type stored in the received buffer to ascertain the type of message received from the central station. The message may be either a status request, a closing alert, a remote on, a control activate, a line sync, a shunt or clear message, a communication test message, or a password load message. Since these messages are in some instances conventional, only exemplary descriptions will be provided. A status request message requests a transfer of the zone description, alarm, shunt and system status data to the transactions buffer for transmission to the central station. A closing alert turns on the sounder to remind the subscriber to either close the system or extend his time as will be described hereinafter. Similarly, a control activate message turns on a particular local output of the transponder unit as indicated in FIG. 3 at lines 74.

The line sync message provides a starting value and related information to the transmit buffer 178 to ensure accurate information for interpreting signals from an encryption circuit 150, to be described in greater detail hereinafter. A shunt or clear signal, from the central station unit, if permitted by a particular transponder unit 70, causes one of the zone inputs 76 of the transponder unit to be disabled (shunt) or returned to operation (clear). The shunt/clear operation may be implemented by a latch associated with the individual zone inputs 72.

To ensure a high level of security, any messages from the central station causing a change in operating parameters of a subscriber system are recorded by the central station unit 10.

Another message which may be received from the central station unit is a remote "on" signal, which causes the system to turn on in the same manner as if the keyboard turned the system on. The keyboard "on" process will be described in greater detail hereinafter. A communications test message initializes a communication test timer (not shown) to cause a transmit carrier to be held on to permit testing. A password load message is issued only in the event that power is lost to the memory 82 of the transponder unit 70, thereby causing all but the master password to be lost. In such event, the central station unit 10, which has stored therein encrypted forms of the subscriber passwords, transmits the same to the subscriber unit where they are deciphered to remove the encryption, and re-entered into the password table. A cyclic redundancy character will typically be added to the password table which forms part of the memory 82.

In the event that the waiting for acknowledge flag 130 was not set, and the message received from the central station unit 10 is a poll of the transponder unit 70, the output of the AND gate 124 will be false. The output of the gate 124 is inverted through a gate 152 to cause any alarm conditions which have been detected to be transmitted to the central station in the following manner. The alarm inputs 72 are provided to a current status register 164. The status of the alarm inputs at the last poll is stored in a previous status register 166. It should be noted that due to the independent but synchronous operation of the transponder unit 70 which scans the alarm inputs 72, the current status register 164 records the accumulated status of the alarm inputs during the period between polls by the central station unit to indicate even short term emergency conditions.

The current status and the previous status are compared in a comparator 168 to determine whether the status has changed since the last poll. If a change has occurred, it is indicated on a line 170, which actuates a status change latch 172. No change in the alarm status causes a signal on a line 174. When the latch 172 is set, a signal appears on the line 176 to cause the information in the current status register 164 to be loaded into a transmit buffer 178, and to transfer the contents of the current status register to the previous status register.

The lines 174 and 176 are or'd together to form an input into an AND gate 180. The remaining input to the AND gate 180 is provided by a transactions buffer pointer 182, the output of which is inverted at the input at the AND gate 180. The buffer pointer 182, which is typically a counter, will indicate an inactive or false signal when transactions from the keyboard or other input 76 are present in a transaction buffer 140. Thus, if the output of the AND gate 180 is true, transactions are present and the comparator 168 has determined whether a status change is present or not.

A carrier timer 184 is then initialized, a transmit carrier 194 associated with the transmitter/receiver 90 is energized, and a signal is provided to the transmit buffer to cause the loading of an encryption data from the encryption circuit 150 as well as a CRC character from a CRC circuit 196. The CRC circuit 196 operates on the contents of the transmit buffer, which will include the transponder ID, the alarm status inputs, and transaction inputs. The manner by which the transactions are entered into the transaction buffer will be described hereinafter in connection with FIGS. 6a–6d. Once the transmit buffer 178 has been loaded, the transmitter/receiver 90 is actuated and transmits the message to the central station, thereby reporting any changes or alarm conditions at the particular transponder. After the message is transmitted, the "waiting for acknowledge" flag 130 is set. The transponder unit then returns to its synchronous operation in scanning the alarm inputs, and the central station unit, after acknowledging the transmission, steps to the next transponder unit.

An additional feature of the present invention, particularly suitable for use with "open window" network configurations, includes a timer 197 associated with the transmitter/receiver 90. The timer 197 is initialized when transmission begins, and disconnects the transmitter 90 from the telephone lines 15 upon timing out. The timer 197 is set to time out well after the transponder 70 has completed sending the current message, and thus affects system operation only in the event the transponder malfunctions and ties up the telephone lines for too long a period. Thus a malfunction in a single transponder cannot disable the entire "open window" line for more than a short period.

Figure 6A:
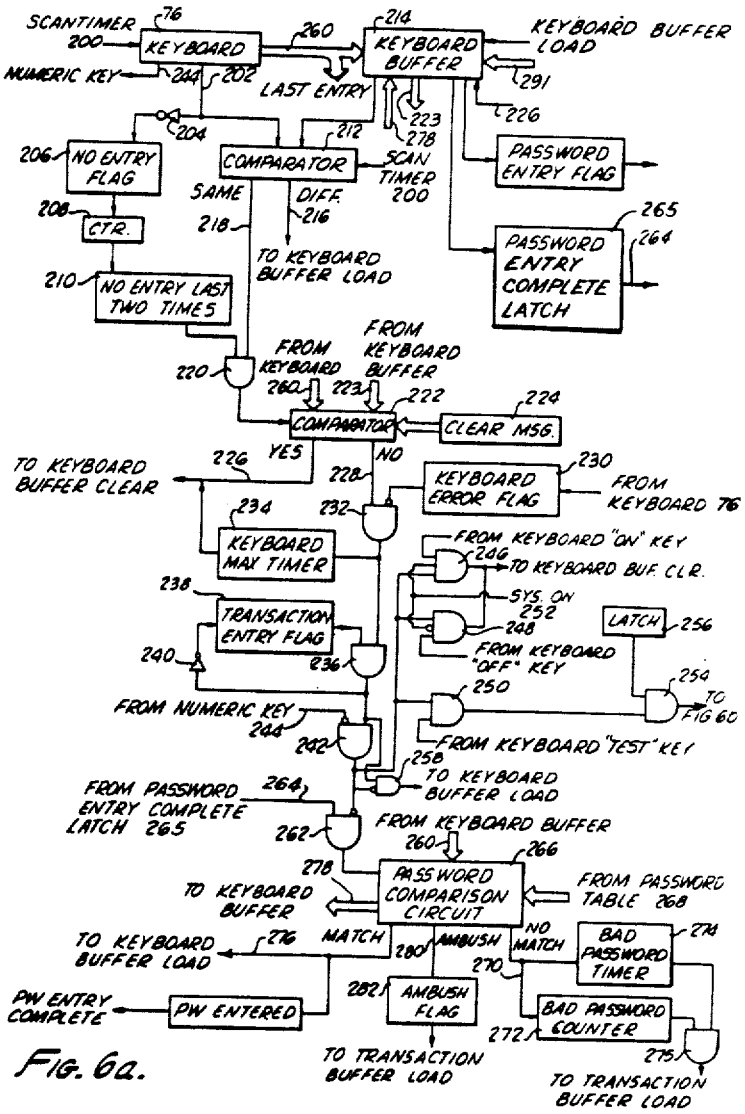
FIGS. 6a–6d depict in schematic form transponder circuitry for entering messages into the subscriber system for changing system parameters.
Figure 6B:
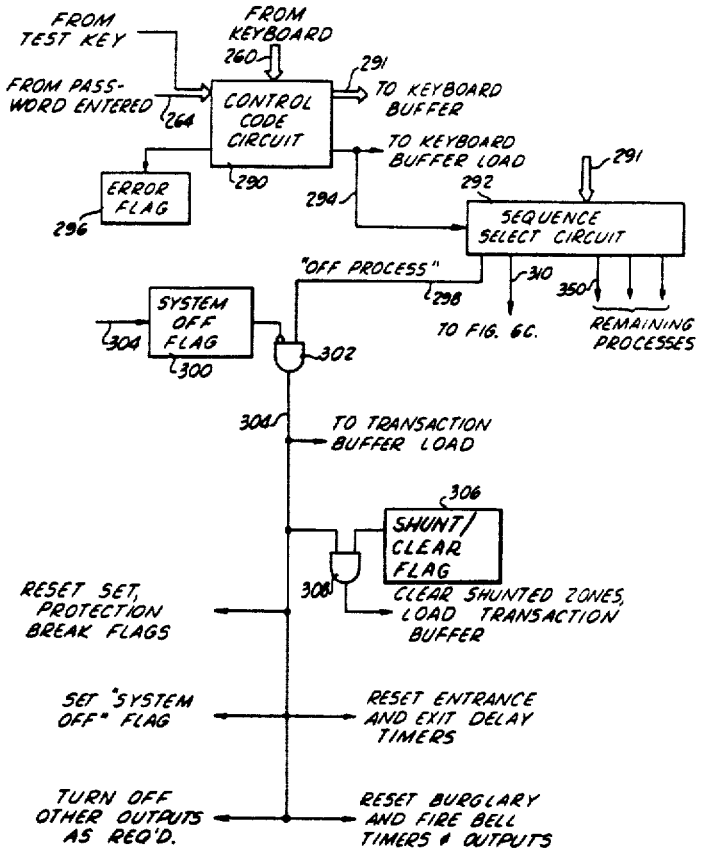
Figure 6C:
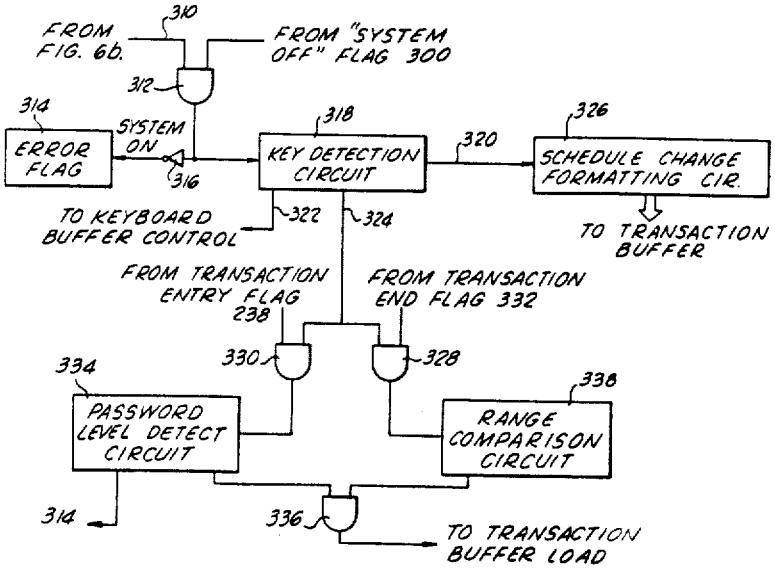
Figure 7:
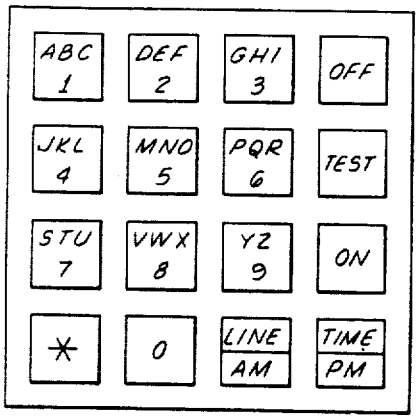
FIG. 7 illustrates a keyboard suitable for use with the transponder unit of FIG. 3.

Turning now to FIGS 6a–6c, the manner by which the transactions are entered into the transactions buffer 140 can be understood. For the purpose of understanding the present invention, transactions may be defined as messages entered by the subscriber for interrogating the transponder system, or changing the operating parameters thereof, and for notifying the central station of such changes. As noted above, the subscriber enters the transaction on the input device 76, typically a keyboard. A slave keyboard and transponder unit may be used to provide further system flexibility, with the slave unit communicating with the central station unit through the main transponder unit. Provision of the use of a slave unit is made in the flow diagrams of Appendix A, although it is believed that the teachings herein are sufficient to permit those skilled in the art to implement such a configuration. FIG. 7 illustrates a suitable keyboard for use with the embodiment disclosed here. The table shown below illustrates transactions which the subscriber may initiate, although those skilled in the art may recognize other subscriber entered messages which can be usefully implemented, given the teachings herein. In the table below, the function of the transaction is described in the left column and the message format is described in the right column. Exemplary ones of these messages will be described in greater detail hereinafter.

| FUNCTION | FORMAT |
|---|---|
| Status Check | (On) (Off) |
| Sounder Cancel (Keyboard Clear) | ** |
| System Off | (PW) (Off) |
| System On | (PW) (Test) (On) |
| Zone Shunt/ Clear | (PW) (Test) * Sl * Cl |
| Irregular Opening | (PW) (Off) (Time) HHMM (AM) (PM) |
| Extended Closing Time | (PW) (Time) HHMM (AM) (PM) |
| Change of Schedule Time | (PW) * (Time) * (O) * (P) * D * HHMM (AM) (C) (T) (PM) |
| Password Add | (PW) * PA * YY * Z * WWWWW |
| Password | (PW) * PD * YY * |

-continued

| FUNCTION | FORMAT |
|---|---|
| Delete | |

For the particular system described here, an asterisk is used to separate fields; however, any suitable designator will do. As can be appreciated from the above table, all transactions which change operating conditions or parameters require the initial entry of a valid password (PW) followed by the transaction code and the substantive message. For the zone shunt/clear transaction, the password is followed by depressing the "test" key, followed by either a shunt (S) entry and the zone number (e.g. S1) or a clear (C) and zone number.

The irregular opening transaction corresponds closely to the schedule change transaction described above and in greater detail hereinafter; the extended closing time transaction is also similar and need not be described in detail here. The password add and password delete transactions, described in greater detail hereinafter, have a slightly different format. To add a password, a password having authority to add other passwords is entered, followed by the transaction code. The "man number" is next entered, followed by the priority level of the password being added, and finally followed by the new password itself. The deletion of a password requires entry of a password authorized to delete other passwords, the transaction code and the man number.

The keyboard 76 is periodically scanned to detect entries by the subscriber; typically, the keyboard is scanned every 20 milliseconds by a basic scantimer 200, which controls the synchronous operation of the transponder unit. When the scantimer enables the keyboard output, a signal will appear on a keyboard output line 202. If a key has been entered, the signal on the line 202 will be true; conversely, if no key has been entered, the output signal on the line 202 will be false. A false signal on the line 202 will be inverted by a gate 204, to actuate a no entry flag 206. A counter 208 receives the output of the no entry flag 206 and, if appropriate, signals a second flag 210, which indicates no entry the last two scans.

If an entry has been received, as indicated by a signal on the line 202, the character entered into the keyboard 76 is compared in a comparator 212 with the last previously entered character. The last previously entered character is stored in a keyboard buffer 214. The scantimer 200 causes the comparator 212 to operate synchronously with the scanning of the keyboard.

If the characters transmitted to the comparator 212 are different, a signal is generated on comparator output line 216 to cause the keyboard buffer to load the character received by the keyboard. However, if the characters are the same, the flag 210 must provide a positive output, indicating no entry during the last two scans, before further processing will occur. By requiring a two scan interval between the same key, it is possible to ensure that a character is actually being entered, rather than entering a second key where the subscriber has in fact only accidentally released and then immediately depressed the same key.

Thus the comparator 212 provides an output on a line 218 if the characters in the keyboard and keyboard buffer are the same, which is combined logically with the status of the flag 210 by means of an AND gate 220. If the output of the AND gate 220 is true, this indicates that the last two keys entered are the same and further processing begins thereon.

The first step in the subsequent processing is to determine whether the transaction is a "clear" message; i.e., a message to clear the keyboard buffer. To determine this, a comparator 222 is provided, which receives the input from the keyboard 76 together with the input from the keyboard buffer 214, and these inputs are compared with a standard clear message stored in a clear message register 224, which may form a portion of the memory 82 (FIG. 3). Typically, the clear message may comprise two asterisks, although any suitable message will do. In the event that the comparator 222 indicates that the entered message is in fact a clear message, the keyboard buffer is cleared via a signal on line 226. If the message monitored by the comparator 222 is not a clear message, a signal appears on the line 228.

If the keyboard error flag 230 has been set, by the keyboard 76, further processing is inhibited by means of an AND gate 232, which provides an inversion on the input from the error flag 230. Also, an audible sounder associated with the local alarm outputs 74 is actuated and must be turned off by clearing the keyboard as described above. However, if the error flag 230 has not been set, a positive signal occurs on the output of the gate 232, initializing a keyboard maximum timer 234. The keyboard maximum timer 234 limits the time duration between successive entries on the keyboard 76, by energizing the keyboard buffer clear line 226 when the timer 234 times out. Typically, the timer 234 is retriggerable and is set for a sufficiently long period to permit reasonable delays between key entries.

The output of the gate 232 is also provided to another AND gate 236, which receives its remaining input from a transaction entry flag 238. If the transaction entry flag 238 has not previously been set, the output of the gate 236 is false, which causes an inverter 240 to send a set signal to the flag 238. The output of the gate 236 then becomes true and further processing is permitted.

The output of the gate 236 is then provided to one input of an AND gate 242, the remaining input of which is supplied by a numeric key output from the keyboard 76 on a line 244. The numeric key input to the gate 242 is inverted, such that if a numeric key has been depressed a false output is received from the gate 242. If the numeric key has not been depressed, the output of the gate 242 controls the output of three AND gates 246, 248, and 250. The remaining inputs to the AND gate 246 are provided by the "on" key from the keyboard 76 and a "system on" latch, which may be a portion of the memory 82. Thus, if the system is on, and the keyboard on key is depressed, the output of the gate 246 becomes true and the keyboard buffer 214 is reset. Similarly, the inputs to the gate 248 are provided from the keyboard "off" key and an inverted form of the signal from the "system on" latch. Thus, if the keyboard "off" key is depressed but the system is already off, the keyboard buffer is caused to be reset.

Finally, if the numeric key has not been depressed, and in fact the keyboard "test" key has been depressed, the output of the AND gate 250 becomes positive. The output of the AND gate 250 is then combined in another AND gate 254 with the output of a pre-programmed latch 256. The latch 256 will typically be a portion of the PROM 84 (FIG. 3). The purpose of the latch 256 is to determine whether a keyboard test will be permitted without the entry of a password. If such testing is permitted, the output of the gate 254 will become true, suitable for further processing as discussed in connection with FIG. 6b.

However, if a numeric key has been depressed, such that the signal on the line 244 is positive, the output of the AND gate 242 goes false. This causes a positive signal on the output of an AND gate 258, which has an inverter on the input supplied by the gate 242 and receives its remaining input from the gate 236. Thus, if a numermic key has been entered, AND gate 236 provides a positive output indicating a transaction, and the character entered in the keyboard is loaded into the keyboard buffer 214 via the data path 260.

From the foregoing, it can be appreciated that valid messages are entered into the keyboard buffer for subsequent processing. The output of the gate 242 is then provided to a gate 262 through an inverter. The remaining input to the gate 262 is provided by a latch 265 controlled by the keyboard, to indicate that the password field is complete, or, that the password entry is complete. The latch 265 will typically comprise part of the memory 82 (FIG. 3).

When the password entry is complete, and the entered password has been transmitted to the keyboard buffer, the positive output on the gate 262 energizes a password comparison circuit 266. The password comparison circuit compares the entered password from the keyboard buffer with the existing passwords maintained in a password table 268, which may form part of the memory 82 (FIG. 3) or may be a series of registers. If the entered password from keyboard buffer does not match a password contained in the password table 268, a signal appears on a "no match" line 270, which causes a bad password counter 272 to increment, and also initializes a bad password timer 274. If a predetermined number of bad passwords are entered within the time duration specified by the bad password timer 274, the outputs of the bad password counter 272 and the bad password timer 274 are both positive, causing a bad password transaction to be loaded into the transactions buffer 140 (FIG. 5). Typically, three bad passwords within thirty minutes would set off a bad password transaction.

Conversely, if the entered password matches one of the passwords in the table 268, a signal appears on the "match" line 276 and the password comparison circuit 266 provides information as to the password priority level on its data output lines 278. A signal on the line 276 thus causes the keyboard buffer to load the password priority level therein in combination with the already entered password, and subsequent processing may be performed.

In some circumstances, it may be possible that a subscriber may be forced to enter a transaction into the system against his will, as during a hold-up or the like. To protect against such forced entries, the password table 268 may be provided with an "ambush" password. In the event that the password from the keyboard buffer 214 matches the ambush password, a signal appears on an ambush line 280, which sets an ambush flag 282 and causes the transactions buffer to load an ambush signal, which may for example be stored in the memory 82 (FIG. 3).

Referring now to FIG. 6b, once the password has been entered and accepted, the transaction entry flag has been set, and a subsequent key entered, the password entry complete line 264 provides a signal to energize a control code circuit 290. The control code circuit 290 operates on the information already stored in the keyboard, to provide a code to the remainder of the processing circuitry for determining the function, or transaction, to be performed. The control code circuit 290 then provides the control code information to the keyboard buffer 214 and also provides the control code information to a sequence select circuit 292. Also, the control code circuit 290 generates on a line 294 a signal for causing the keyboard buffer to load the control code information, and for causing the sequence select circuit 292 to receive the control code.

As set forth in the table above, each of the transactions illustrated includes the numeric password followed by an alpha character transaction code. Although the particular coding used is subject to great variation, and need not follow the pattern set forth hereinabove, transaction codes will typically be distinguishable from the password either by field separation or different character types. Thus, for the particular transactions set forth above, if the password field is followed by a numeric key entry, the control code circuit 290 rejects the entry and sets an error flag 296.

Once the control code has been established, and provided to the sequence select circuit 292, the circuit 292 determines any changes in operating state which are to be effected locally. Thus, as shown in FIG. 6b, if the process selected by the subscriber is the process of turning the system "off" (performed when the premises are opened for normal business), the sequence select circuit 292 will energize a line 298. If the line 298 is actuated, and the system has not previously been turned off as manifested by the energized state of a system off flag 300, the output of an AND gate 302 (which receives the signals on the line 298 and the inverted signals from the flag 300) energizes and provides a signal on a line 304.

The signal on the line 304 causes the transaction buffer to load the "off" transaction, typically stored in the memory 82. The energized signal on line 304 also resets various flags, including the system off flag, turns off any necessary outputs, resets burglary and fire bell timers and outputs, and resets the entrance and exit delay timers. It will be appreciated that the off process is typically performed within a short period after entering the premises where the system is operating, or in the "on" state.

In some circumstances the keyboard 76 will be located at a substantial distance from the entry point. This, it may be desirable to provide at an intermediate point means for causing additional entrance delay, which can be tied into the conventional entry delay timer and may be keyed or otherwise actuated at a point between the entry point and the keyboard. Finally, it may be desirable to automatically clear any zones which have been shunted previously. Such a provision may be provided for by the subscriber, and would typically be included in the PROM 84 (FIG. 3). Thus, if the line 304 were energized and a shunt/clear flag 306 also provided a positive output, the combination of the two would provide a positive output on an AND gate 308. This would then cause the shunted zones to be cleared, and a "clear shunted zones" transaction would be loaded in the transactions buffer for communication to the central station. From the foregoing, the manner in which the subscriber may turn the system off without communication with the central station except through the transponder unit 70 can be appreciated. The remaining processes which may be performed by the subscriber are similarly performed without the need for direct communication between the subscriber and a central station operator, but rather may be accomplished solely through the communications line between the transponder unit and the central station unit.

Referring now to FIG. 6c, another of the sequences available to the subscriber for altering system parameters is illustrated therein. The particular sequence reflected by the circuitry shown in FIG. 6c is the schedule change process, which is entered by the message described previously, and enabled by a signal from the sequence select circuit 292. The schedule change process will typically be required for either permanent or temporary changes in either opening or closing time for the transponder unit and therefore the subscriber system. The related processes for irregular opening or extended closing will preferably be used for one-time changes in schedule.

Turning now to FIG. 6c, if the subscriber has entered the proper format for a schedule change, the sequence select circuit will provide a signal on a line 310, which provides one input to an AND gate 312. The remaining input to the AND gate 312 is provided by the system off flag 300. Thus, the system must be off before the schedule change may be entered. Again, it is to be understood that the system is off during normal working hours and on when the system is to provide the full scope of protection, even though certain functions such as day burglary and hold-up may continue to operate.

In the event the system is on when the schedule change process is requested, an error flag 314 may be set through an inverter 316. However, if the system is off, a positive signal will be provided to a key detection circuit 318. The key detect circuit 318 determines whether the next key entered is an asterisk, an AM or PM key, or a numeric key. If an asterisk key has been entered on the keyboard 76, a signal is provided on a line 320. If a numeric key has been entered, a signal appears on a line 322. If an AM or PM key has been entered, a signal appears on a line 324.

If a numeric key is entered, the keyboard buffer control is caused to receive the digit entered at the keyboard. If an asterisk is entered, the end of a field is indicated and the previously entered characters are matched to the pre-defined format by means of a schedule change formatting circuit 326. It should be understood that although the asterisk has been used here for indicating a field end, any system distinguishable character is acceptable. The schedule change formatting circuit 326 checks to ensure that each of the fields required for the particular transaction, as set forth in the foregoing table, is satisfied, and then transmits the schedule change to the transaction buffer for communication to the central station.

In the event that the line 324 is actuated, in response to an AM or PM key, the signal is fed through a pair of AND gates 328 and 330. The remaining input to the AND gate 328 is provided by a transaction end flag 332, triggered by the schedule change formatting circuit. The remaining input into the AND gate 330 is provided by the transaction entry flag 238. The output of the AND gate 330 activates a password level detector circuit 334, which determines whether the password which is attempting to enact the schedule change is of a sufficiently high priority to permit the change.

For example, the master password described above would be permitted to change the system in any desired manner acceptable to the central station. However, other employees may not need such flexibility to perform their appointed functions, and it may be useful to limit the accessibility of the alarm system for these individuals. Thus, it is useful to have a plurality of security levels. In the event that a password does not have the requisite security level, the error flag 314 is actuated. If the password is of a sufficient level, the password level detect circuit 334 causes a positive signal on its output which provides one input to an AND gate 336.

In the event that the transaction end flag 332 has been set, a signal is provided by the gate 328 to a range comparison circuit 338, which operates in a manner similar to the schedule change formatting circuit 326. The range comparison circuit 338 ensures that the days, hours and minutes entries are within acceptable limits, and provides the remaining input to the AND gate 336. In the event that all fields satisfy the requisite format, the output of the gate 336 in combination with the schedule change formatting circuit 326 causes the completed transaction to be transferred to the transactions buffer for subsequent processing as described above in connection with FIG. 5.

Figure 6D:
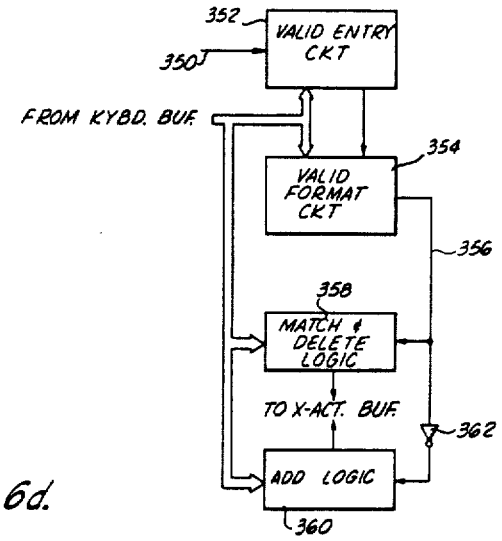

Although it is believed that the above-described circuitry, together with the corresponding flow diagrams attached hereto as Appendix A provides sufficient teachings for those skilled in the art to implement the remaining transaction functions in either a microprocessor or dedicated hardware embodiment, reference is now made to FIG. 6d, which illustrates in schematic block diagram form the password add and delete process noted above. The password add and delete process is for use when the subscriber wishes to designate a new individual as having authorization to enter the system and change at least some of the operating parameters of the transponder unit. As noted above, passwords may be of several levels, each higher level being given the ability to change more parameters of the operating system.

The password add and delete sequence is carried on without disclosure of the password to the central station operator. That is, the subscriber may add a password for a particular individual, or may delete the same, and the addition or deletion will be transmitted to the central station unit with a print-out of only the man number being added or deleted together with the man number of the person entering the transaction. Additional protection is provided by causing the password to be encrypted in the transponder unit 70 before transmission to the central station, by means of the encryption circuit 150 described above in connection with FIG. 5. Security is further enhanced by associating with each password a particular man number, and then using the man number rather than the actual password in all displays of system transactions at the central station.

Thus, if an individual desires to open the system at an irregularly scheduled time, the individual enters the transaction on the keyboard in the format described in the table above, which includes his password. When the transaction is displayed at the central station to alert the central station that such an irregular opening has been performed, only the man number of the individual entering the transaction is displayed. Thus it can be seen that substantial security is provided in connection with the passwords used in the system.

In the event the subscriber desires to add or delete a password, a positive signal is provided on the line 350 of the sequence select circuit 292. This enables a valid entry detection circuit 352 which receives the message entered from the keyboard buffer 214. The valid entry circuit 352 initially determines that a password of suitable priority has been used. Typically, although not necesarily, use of the master password will be required to either add or delete other passwords. If the password is not of a suitable level, the valid entry circuit 352 sets an error flag such as error flag 296, which causes an indication to be made to the user, through a light, sounder or other device. If a suitable password has been used, a signal is supplied to a valid format detection circuit 354.

When the valid format circuit 354 is enabled by the circuit 352, the fields of the message stored in the keyboard buffer are compared to a standard format and analyzed to determine whether the transaction is a password add sequence or a password delete sequence. As can be determined from the table above, to delete a password only the man number need be entered in combination with the password delete transaction code. If a password is being added, the password level must be entered, together with the man number and the new password. The password add transaction code must, of course, also be added.

If the password delete transaction is being used, a signal of a first state will appear on the output 356 of the format circuit 354. This will enable a password match and delete circuit 358. Conversely, if the password add sequence is to be used, a signal of an opposite state will appear on the output line 356, to enable an add logic circuit 360. If the password delete transaction is to be performed, the entered man number is matched against the range of man numbers in the particular system. The range of man numbers is limited only by the available memory devices and need not be sequential.

The match and delete logic 358 then determines whether the man number entered in the subscriber message matches an actual man number in the system, typically stored in the memory 82. Should the entered man number not match a man number already stored in the system, the error flag 296 will be set. However, it will generally be the case that the entered man number will match an existing man number, whereupon the password match and delete logic 358 will cause the password table entry for that man number to be deleted from the password table 268. Also, the circuit 358 will cause to be loaded into the transaction buffer a password delete transaction message from the memory 82. After the transaction has been completed, the keyboard buffer is cleared and the system is permitted to continue with the next scan.

Conversely, should a password add sequence be entered, the password add logic circuit 360 will be enabled from the line 356 via an inverter 362. The logic circuit 360 then determines whether the entered password is of a valid priority type and the password priority level is acceptable, then the passwords in the existing password table are searched to determine whether the same password has been entered for a slave system or for a different man number. If the password and man number have been previously entered for a different system, the password is added simply by indicating both systems rather than the previously indicated system, and a password load transaction is loaded from the memory 82 into the transaction buffer from the memory 82. If the password has not previously been used, the add logic 360 ascertains whether a password table entry is available. If no entry is available, the error flag 296 is set. Usually, however, room for a new entry will be available in the password table 268 of the memory 82 and the new password is caused to be added thereto by the circuit 360. The transaction buffer is then loaded with a password add message for transmission to the central station, and the keyboard buffer is cleared. It is to be remembered that the password transaction process is transmitted, as with all other messages from the transponder unit, in encrypted form to the central station.

Having fully described the one embodiment of the present invention, it is to be understood that numerous variations and equivalents which do not depart from the scope of the present invention will be apparent to those skilled in the art. These variations and equivalents are intended to be included within the scope of the present invention.

We claim:

1. An alarm apparatus operating within a predetermined set of operating parameters comprising first input means adapted to receive at least one signal representative of the status of an alarm sensor, second input means for entering changes to said operating parameters other than actuating or deactuating said alarm apparatus, sequencing means responsive to said first and second input means for generating signals representative of the status of at least one alarm sensor and the changes received from said second input means, and transmitting means for communicating to a central alarm station the status of the at least one alarm sensor together with the changes to system operating parameters.

2. A method for communicating a change in system operating parameters, other than actuating or deactuating the subscriber system, in a subscriber system of a central station alarm system *capable of transmitting alarm inputs* comprising the steps of entering in the subscriber system a change in said system operating parameters other than actuating or deactuating the subscriber system, transmitting the change in system operating parameters to the central station in the same manner as is used to transmit alarm inputs, and altering the system operating parameters stored in the central station to correspond to the changes entered in the subscriber system without action by an operator of the central station.

3. The alarm apparatus of claim 1 wherein said alarm apparatus is adapted for use in a central station alarm system and further including means for identifying [the] *an* individual entering changes to said operating parameters.

4. The method of claim 2 further including the step of automatically identifying at the central station [the] *an* individual entering in the subscriber system changes in system operating parameters.

5. An alarm apparatus having a predetermined set of operating parameters for remote use in a central station alarm system and adapted for bidirectional *non-voice* communication with a [central station] *first* unit, *said alarm apparatus* comprising

*one or more second units having* first input means responsive to signals from said [central station] *first* unit, second input means adapted to receive at least one signal representative of [the] *a* status of an alarm sensor, third input means for entering signals to alter at least some of said operating parameters *other than actuating or deactuating said second unit*, and output means [adapted for communicating] *operable to communicate* to said [central station] *first* unit the status of said alarm sensor and said signals from said third input means.

6. A central station alarm system comprising a first unit, *and* a plurality of remotely located second units adapted for bidirectional *non-voice* communication with said first unit and each of said second units having a predetermined set of operating parameters, first input means adapted to receive at least one signal representative of [the] *a* status of an alarm sensor, second input means adapted to receive signals from said first unit, third input means for entering changes in said operating parameters *other than actuating or deactuating said second unit*, first processing means for altering said operating parameters in response to signals received from said second and third input means, and output means [for supplying] *operable to supply* to said first unit the status of said first input means and said operating parameters in response to an inquiry from said first unit.

7. The alarm system of [either] claim [5 or] 6 wherein at least one of said second units includes alarm means for indicating the status of said first input means even when communications [with] *between said second units and* said first unit are disabled.

8. The alarm system [of either] of [claims 5 or] *claim* 6 wherein said first input means is adapted to receive signals representative of the status of a plurality of alarm inputs.

9. The alarm system of claim 8 wherein the operating parameters of said second units include indicia capable of disabling at least a portion of said first input means to mask at least one of said signals representative of the status of said alarm inputs.

10. The alarm system of claim 9 wherein said first unit includes means for altering said operating parameters of each of said second units.

11. The alarm system of claim 8 wherein said second unit is responsive to signals from said first unit to actuate said second unit in the event [the] *a* user of said second unit fails to timely actuate said second unit.

12. An alarm apparatus having a predetermined set of operating parameters, and adapted for bidirectional *non-voice* communication with a central station unit, comprising first input means responsive to at least one signal representative of [the] *a* status of an alarm sensor, keyboard means for entering indicia to identify each user of the alarm apparatus and for entering changes to said operating parameters, and output means [for communicating] *operable to communicate* to said central station *unit* said [identifying] indicia each time any of said operating parameters is changed.

13. The alarm system of claim 8 wherein said second unit is responsive to signals from said first unit to monitor signals received by said first input means representative of said plurality of alarm inputs.

14. The alarm system of claim 8 wherein one of said operating parameters is a normal closing time at which the alarm system is activated, and [said alarm] *an alerting* means of said second unit is actuated to remind [the] *a* user *at one of said second units* of the normal closing time.

15. The alarm system of claim 9 wherein each [of said disabled] alarm [inputs] *input disabled subsequent to an opening time of the alarm system* is returned to an enabled state at the next [subsequent] opening time [of the alarm system].

16. A method for transmitting updated information in a central station alarm system from a remotely located unit to [the] *a* central station unit comprising the steps of storing information representative of at least one alarm input, entering first indicia representative of a *specific* user of the remotely located unit without voice communication between said central station unit and said remotely located unit, entering second indicia representative of a change in operating parameters of the remotely located unit, transmitting at least said first indicia to the central station unit, and entering said change in operating parameters only if the user represented by said first indicia is authorized to make changes in the operating parameters of the system.

17. The method of claim 16 further including the steps of transmitting said second indicia to the central station unit, and entering the change represented by said second indicia only if the user represented by said first indicia is authorized to change the operating parameters of the remotely located unit in the manner indicated by said second indicia.

18. The method of claim 16 further including the step of entering a third indicia in place of said first indicia to indicate an emergency, without voice communication between said remotely located unit and said central station unit.

19. A central station alarm system comprising a [primary] *first* unit, and a plurality of [secondary] *second* units for bidirectional non-voice communication with said first unit having a predetermined set of operating parameters, keyboard means for entering indicia representative of [the] *a* user of the [secondary] *second* unit and changes in said operating parameters, and transmitter means for providing to said [primary] *first* unit said indicia representative of the user of the [secondary] *second* unit and changes in said operating parameters without voice communication between said user and an operator of the [primary] *first* unit.

20. A central station alarm system comprising a first unit, and at least one remotely located second unit adapted for communication with said first unit, said second unit having first input means adapted to receive at least one signal representative of [the] *a* status of an alarm sensor, and second input means adapted to receive a signal representative of a test situation, and output means for supplying to said first unit the status of said alarm [input] *sensor* coupled with said signal representative of a test situation to cause said first unit to recognize alarm signals from said first input means as a test without voice communication between [the] *an* operator of said first unit and [the] *a* user *of said second unit.*

21. The method of claim 16 further including the step of supplying to the remotely located unit from the central station unit at least some of said first indicia in the event the first indicia has been lost or destroyed at the remotely located unit.

* * * * *

UNITED STATES PATENT AND TRADEMARK OFFICE

CERTIFICATE OF CORRECTION

PATENT NO. : Re. 32,468

DATED : August 4, 1987

INVENTOR(S) : LeNay et al.

It is certified that error appears in the above-identified patent and that said Letters Patent is hereby corrected as shown below:

Appendix pages A-1 through A-32, which are referred to at column 6, lines 52-54 are hereby incorporated in Reissue Patent 32,468.

Signed and Sealed this

Eighth Day of December, 1987

*Attest:*

DONALD J. QUIGG

*Attesting Officer*

*Commissioner of Patents and Trademarks*

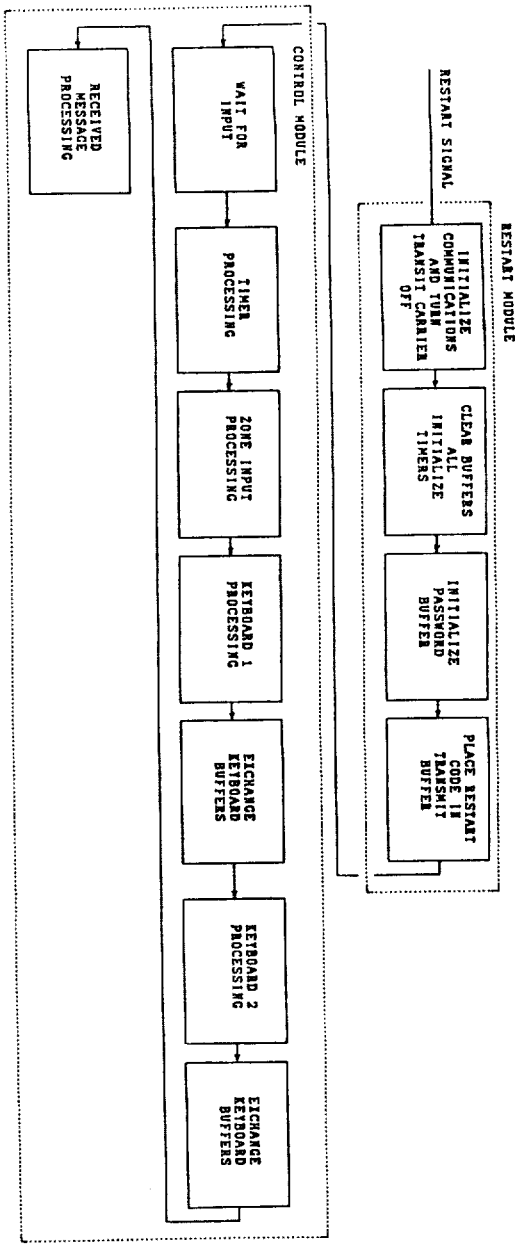
RESTART AND CONTROL MODULES
APPENDIX A-1

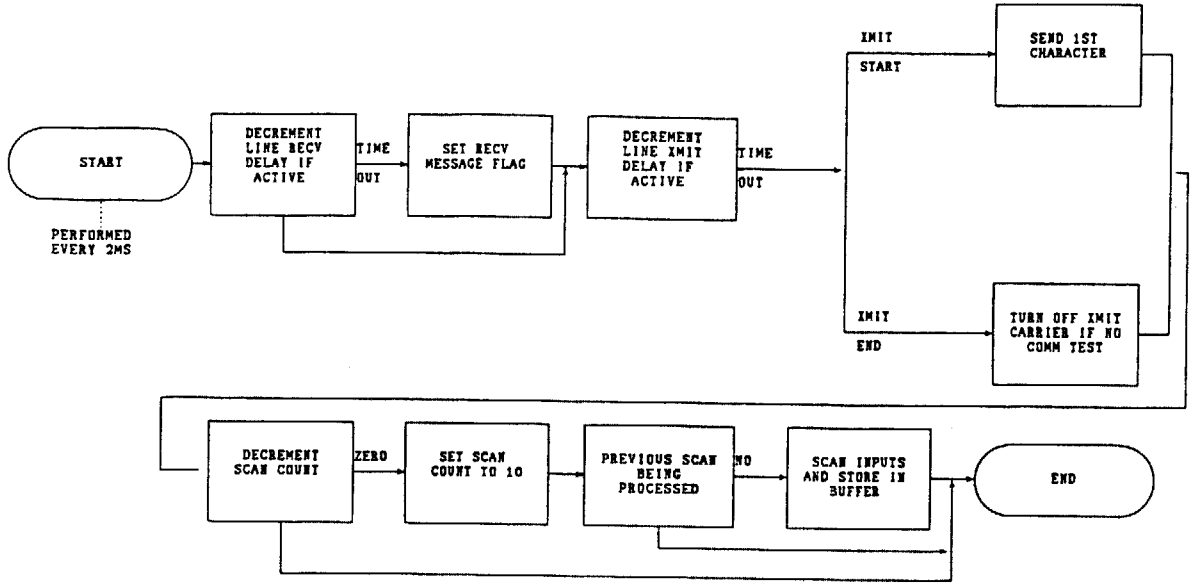
SCAN PROCESSING
APPENDIX A-2

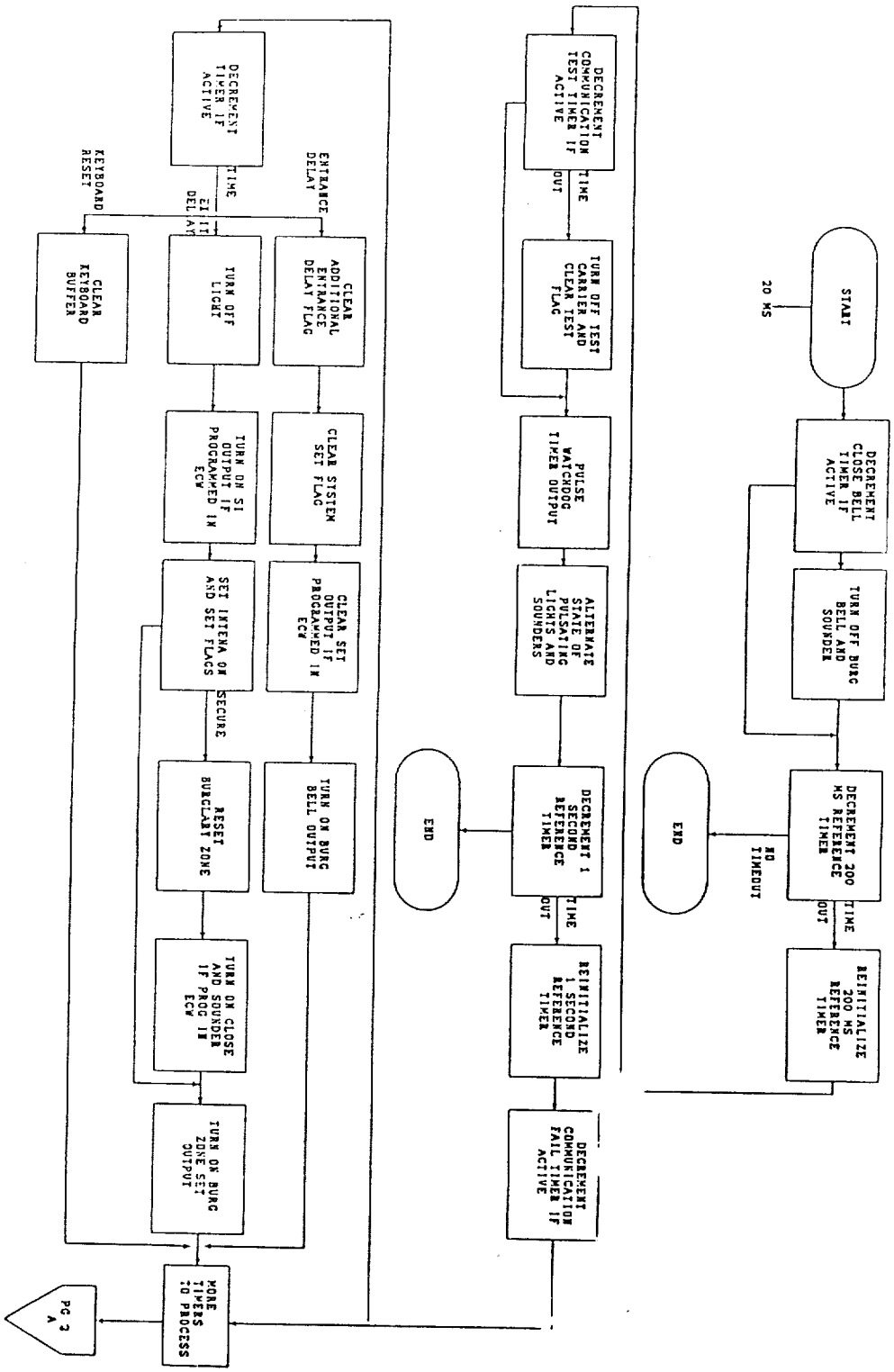
TIMER PROCESSING

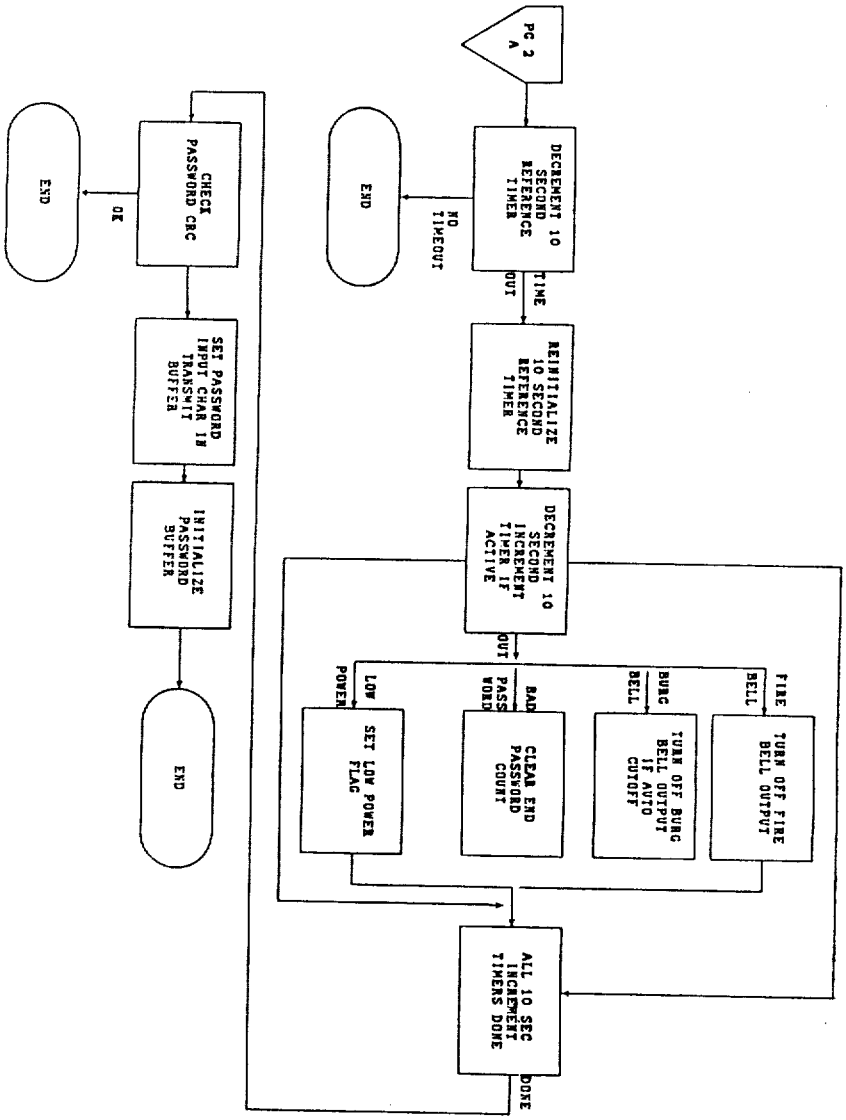
TIMER PROCESSING (CONT'D)

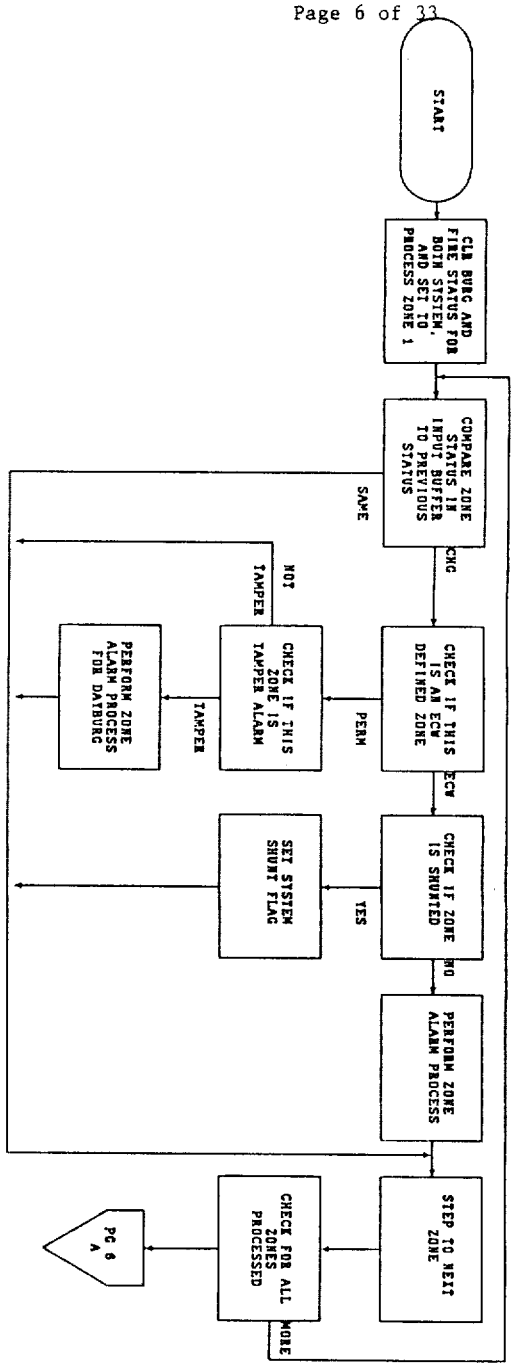
ZONE INPUT PROCESS

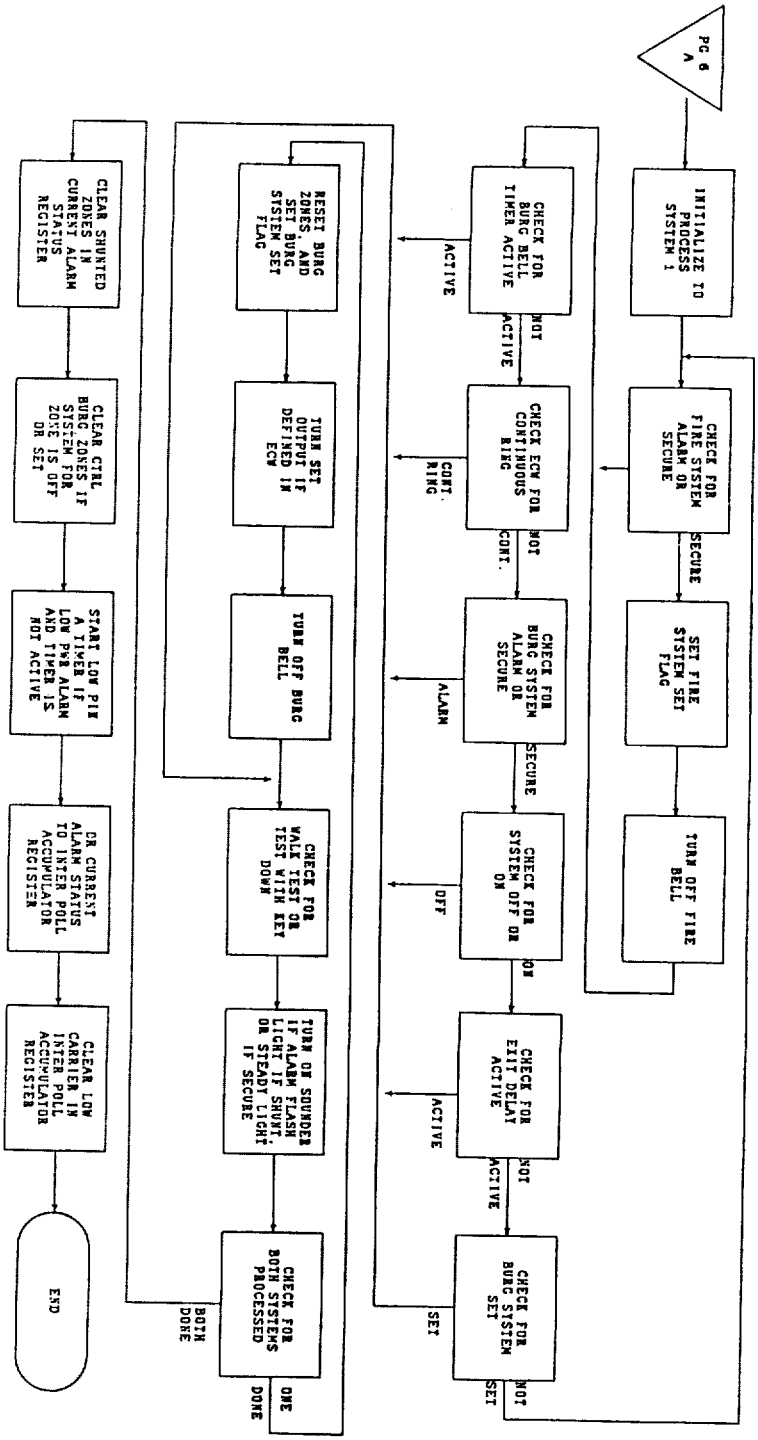
ZONE INPUT PROCESS (CONT'D)
APPENDIX A-6

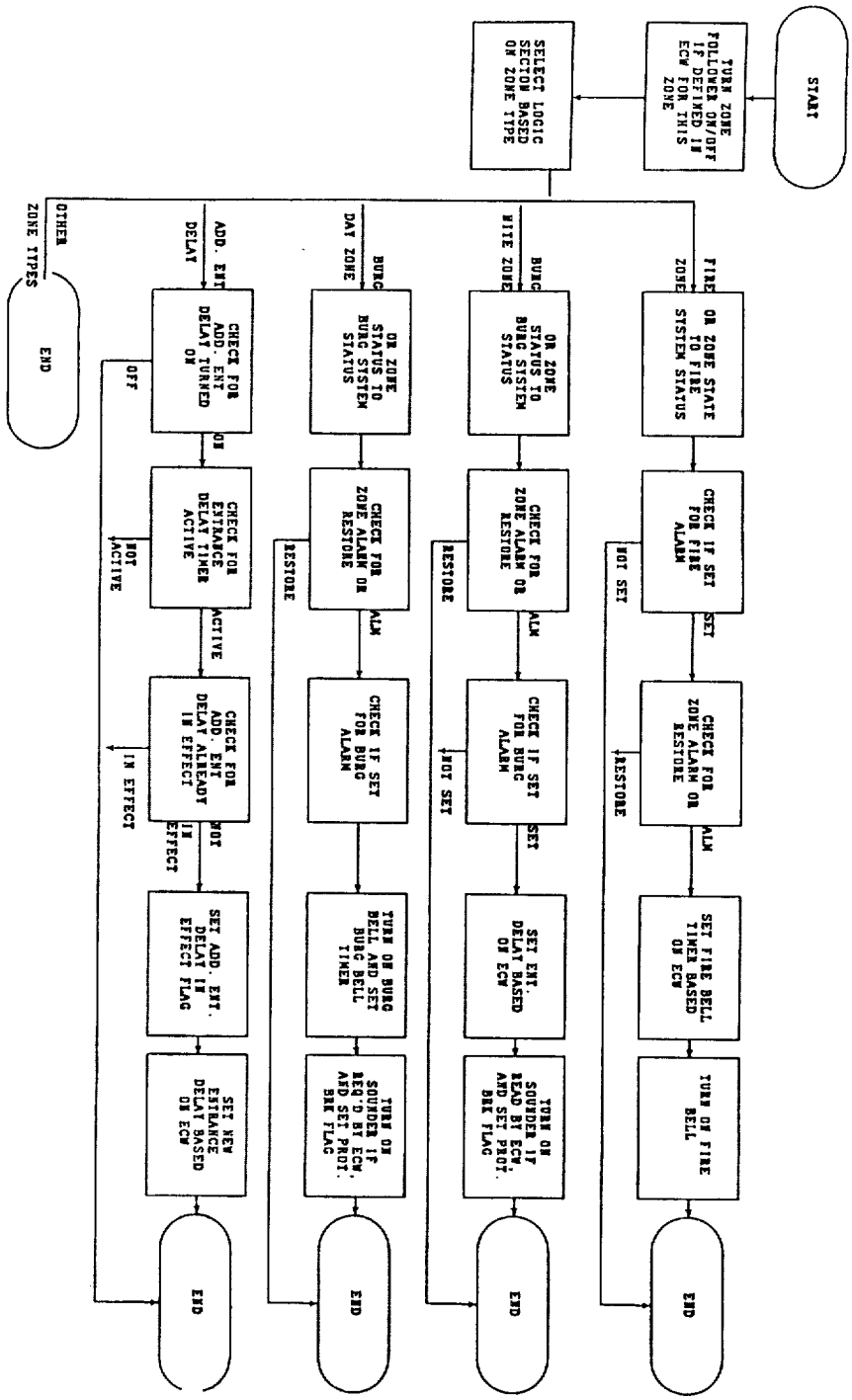
ZONE ALARM PROCESS
APPENDIX A-7

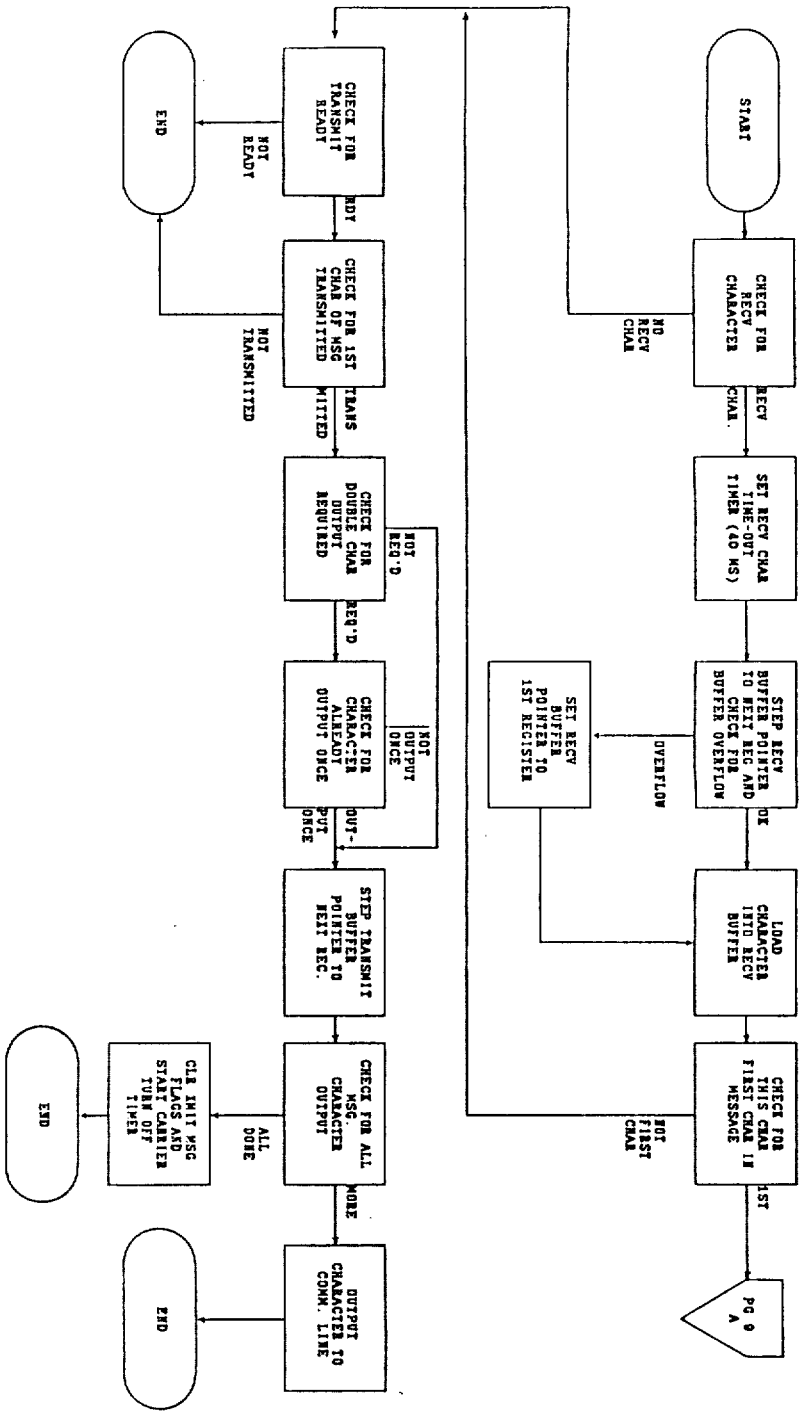
START
CHECK FOR RECV CHARACTER
RECV CHAR.
NO RECV CHAR
SET RECV CHAR TIME-OUT TIMER (40 MS)
STEP RECV BUFFER POINTER TO NEXT REC AND CHECK FOR BUFFER OVERFLOW
OK
OVERFLOW
SET RECV BUFFER POINTER TO 1ST REGISTER
LOAD CHARACTER INTO RECV BUFFER
CHECK FOR THIS CHAR FIRST CHAR IN MESSAGE
NOT FIRST CHAR
1ST
PG 9 A
CHECK FOR TRANSMIT READY
RDY
NOT READY
END
CHECK FOR 1ST CHAR OF MSG TRANSMITTED
TRANSMITTED
NOT TRANSMITTED
CHECK FOR DOUBLE CHAR OUTPUT REQUIRED
REQ'D
NOT REQ'D
CHECK FOR CHARACTER ALREADY OUTPUT ONCE
OUT-PUT ONCE
NOT OUTPUT ONCE
STEP TRANSMIT BUFFER POINTER TO NEXT REC.
CHECK FOR ALL MSG. CHARACTER OUTPUT
ALL DONE
MORE
CLR XMIT MSG FLAGS AND START CARRIER TURN OFF TIMER
END
OUTPUT CHARACTER TO COMM. LINE
END

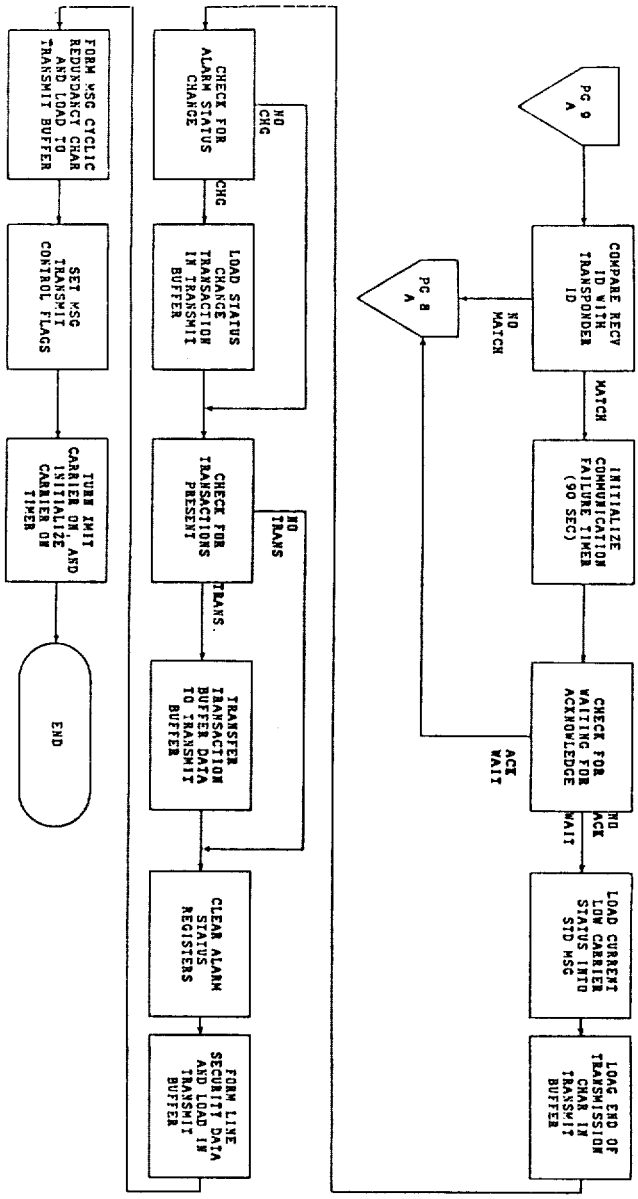
APPENDIX A-9

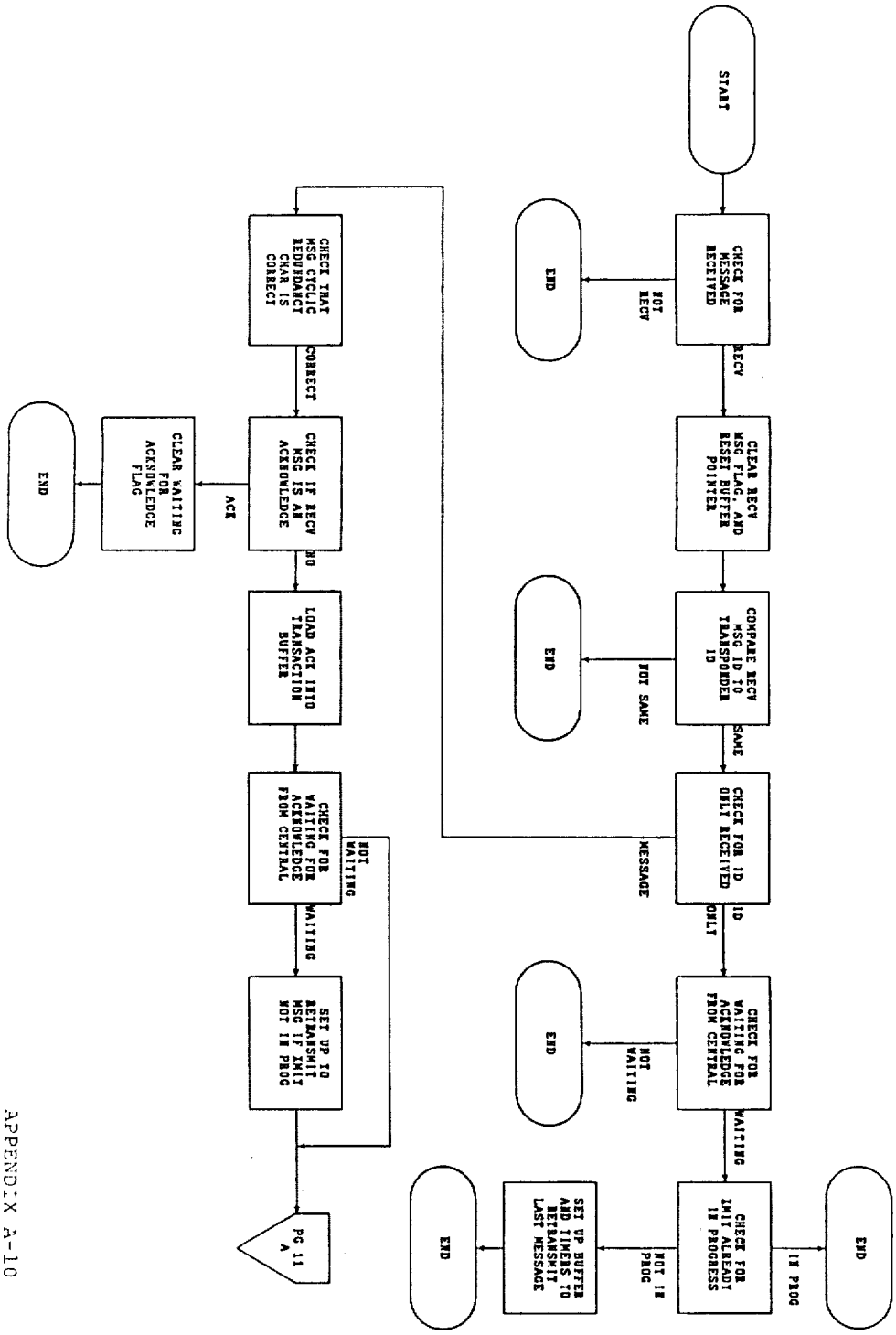
APPENDIX A-10

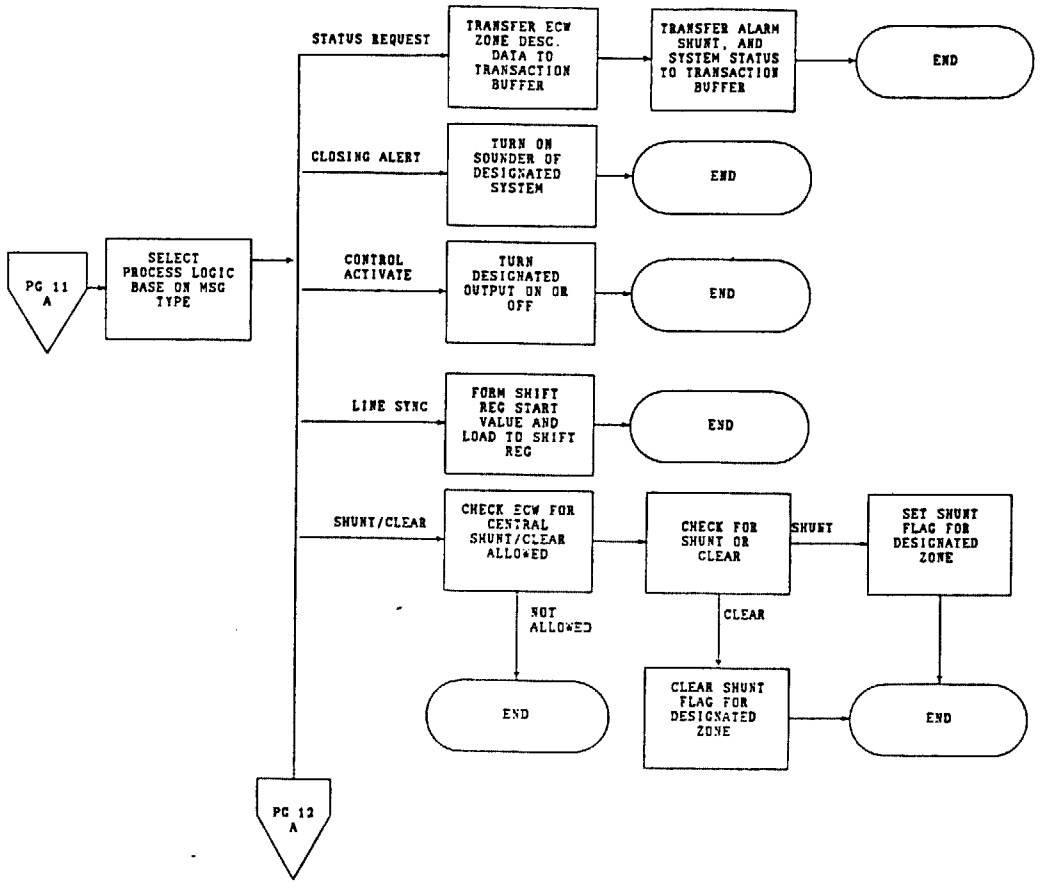
RECEIVED MESSAGE PROCESS
APPENDIX A-11

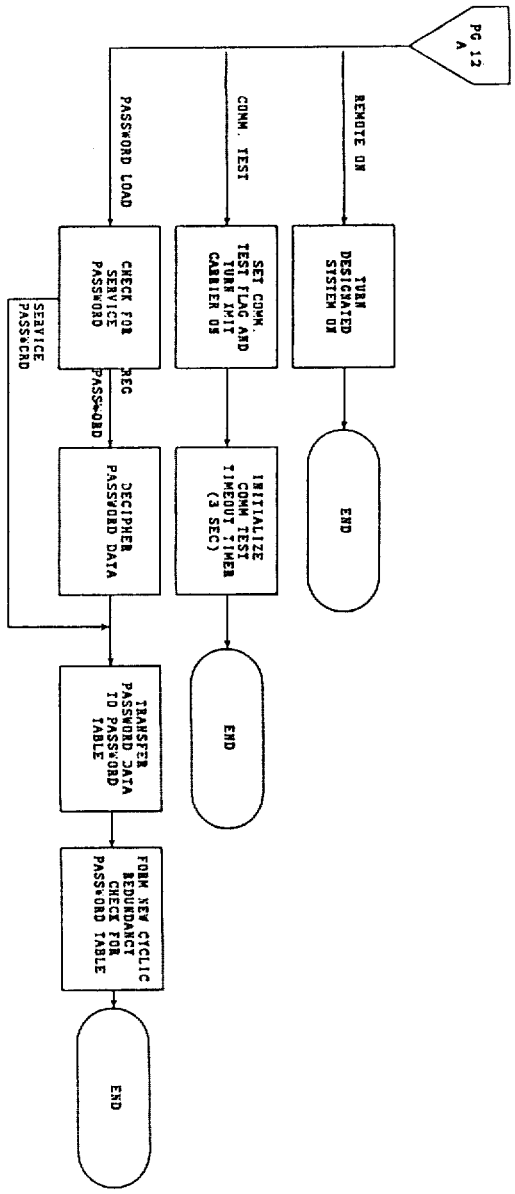
RECEIVED MESSAGE PROCESS
APPENDIX A-12

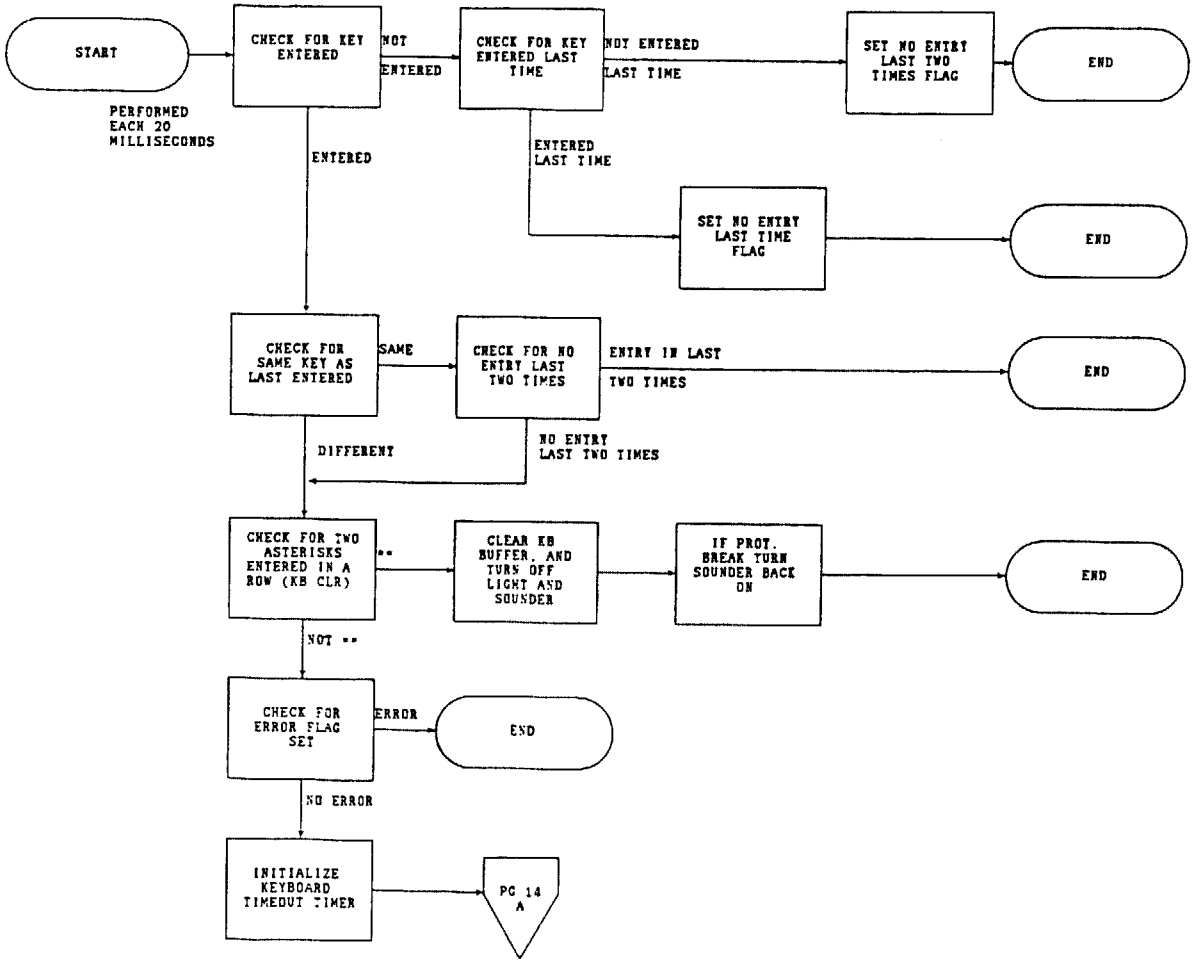
KEYBOARD INPUT PROCESS
APPENDIX A-13

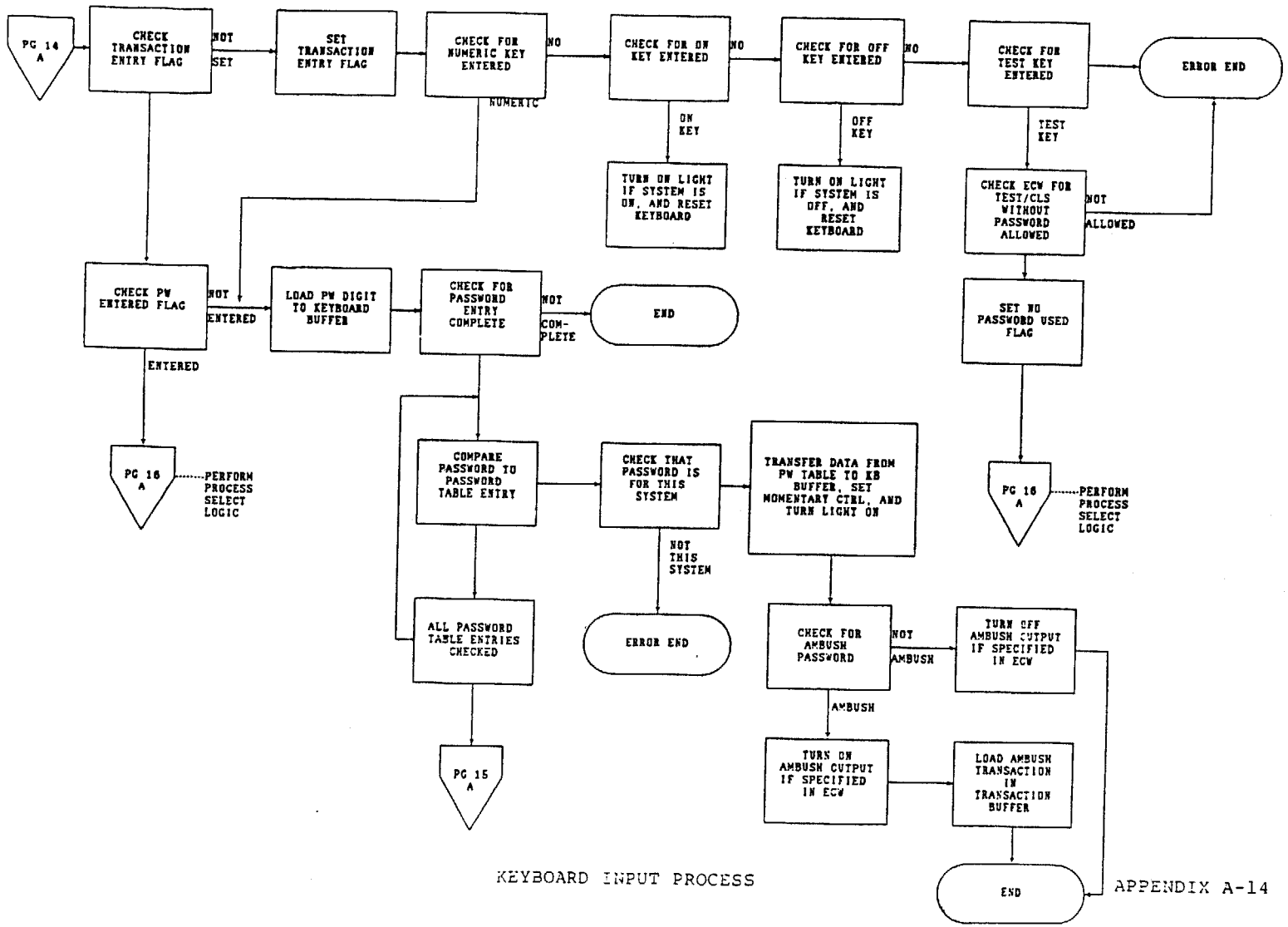
KEYBOARD INPUT PROCESS
APPENDIX A-14

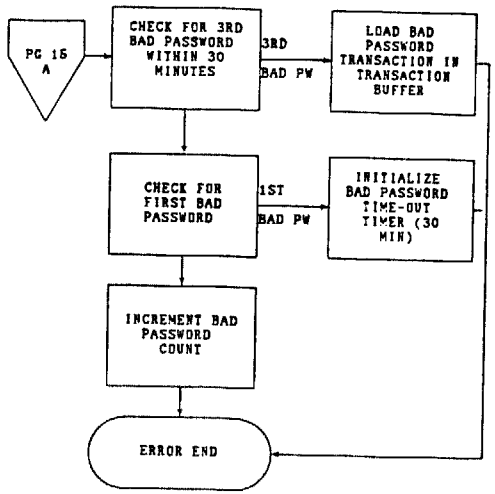
KEYBOARD INPUT PROCESS
APPENDIX A-15

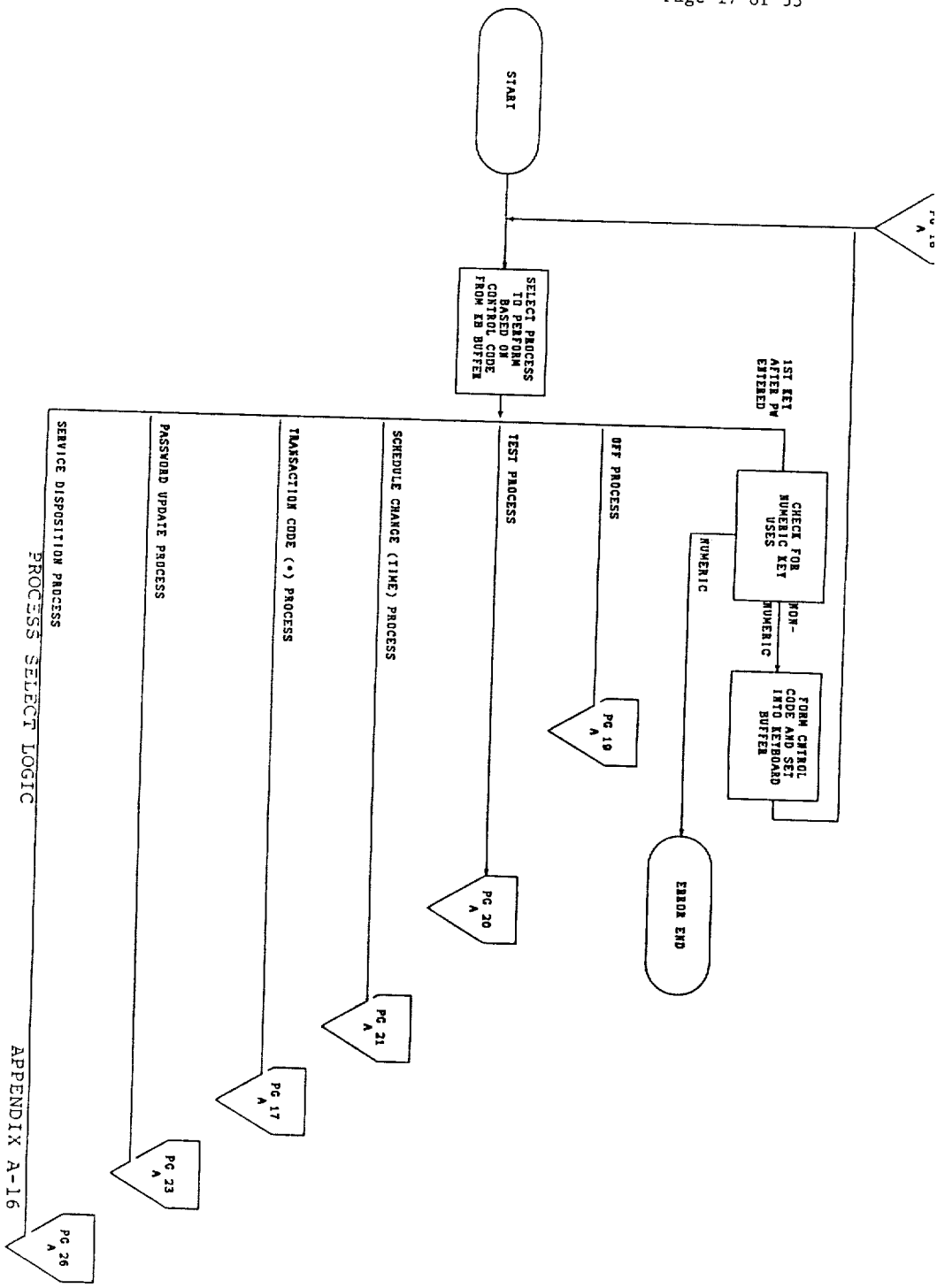
PROCESS SELECT LOGIC
APPENDIX A-16

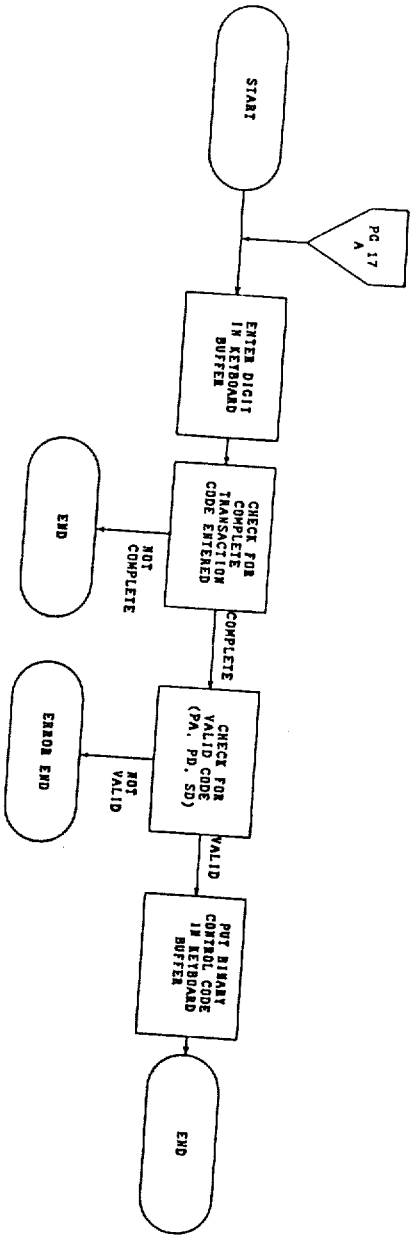
TRANSACTION CODE PROCESS

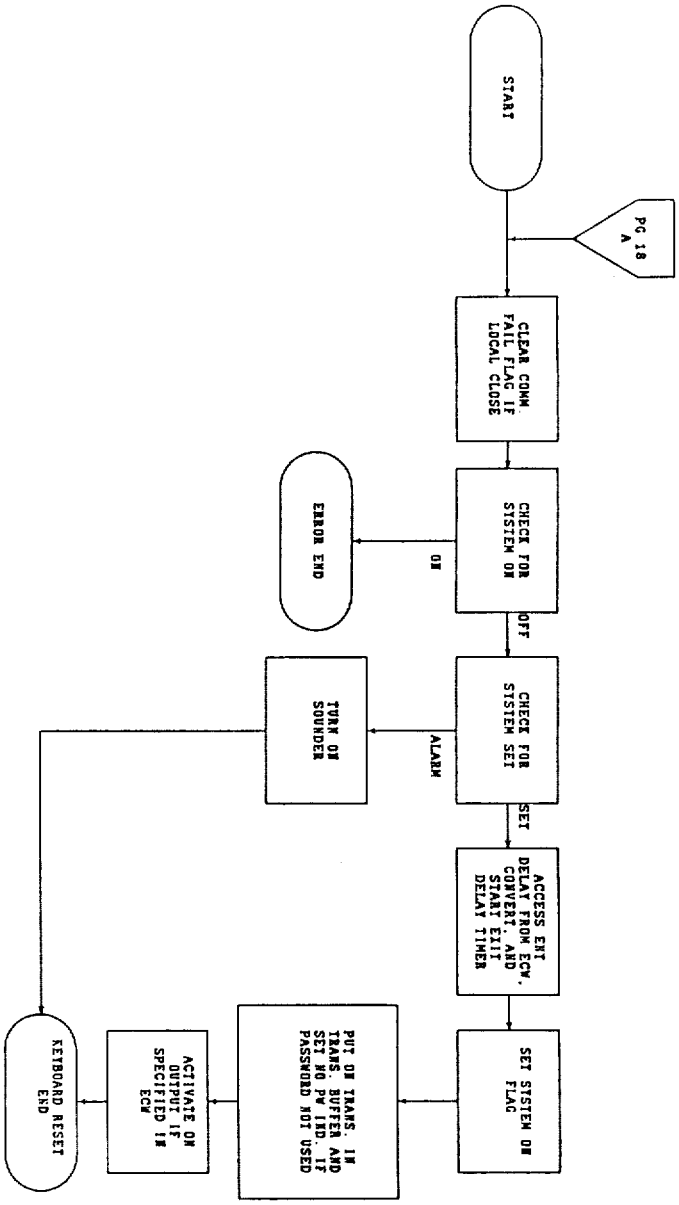
ON PROCESS
APPENDIX A-18

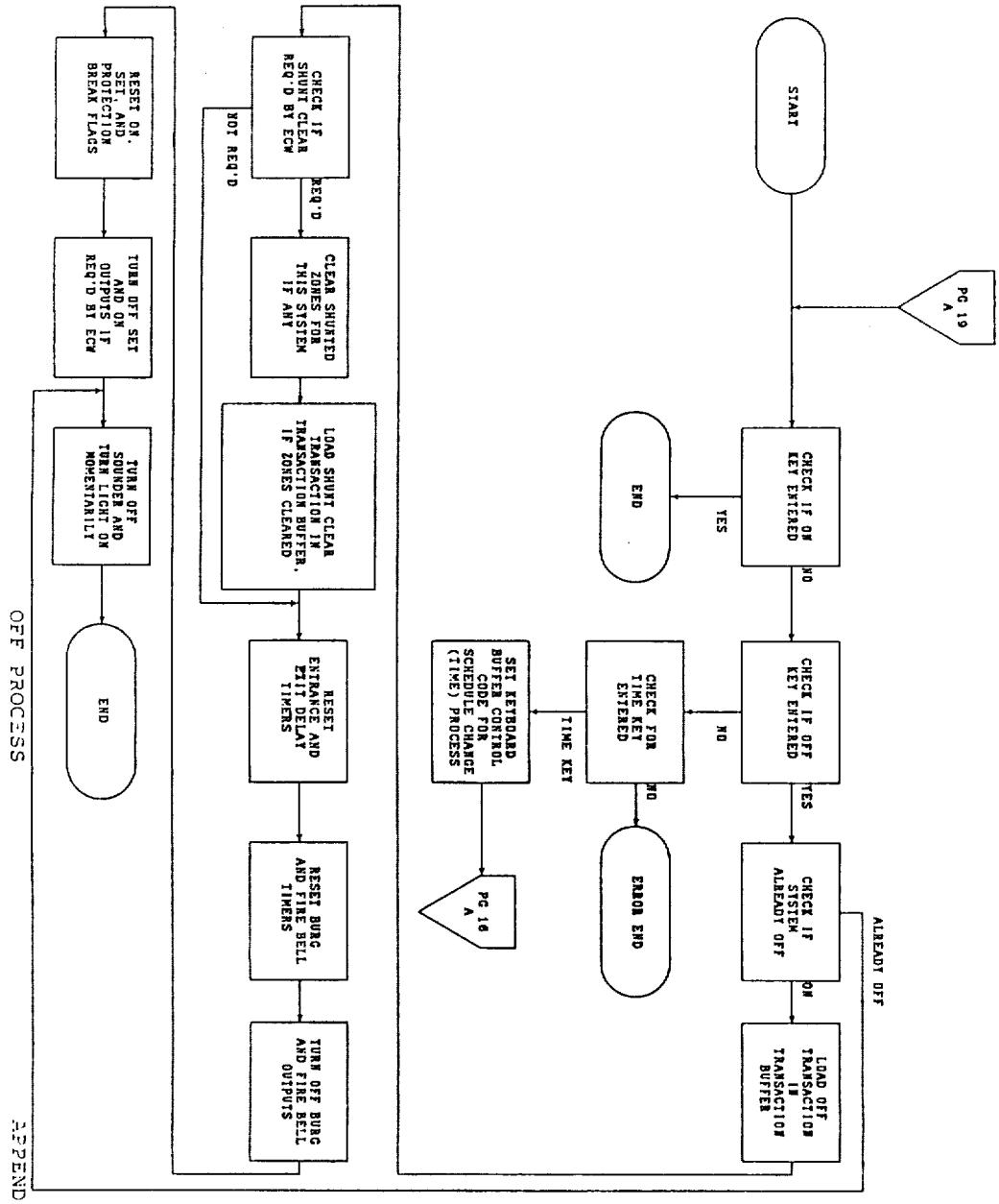
OFF PROCESS

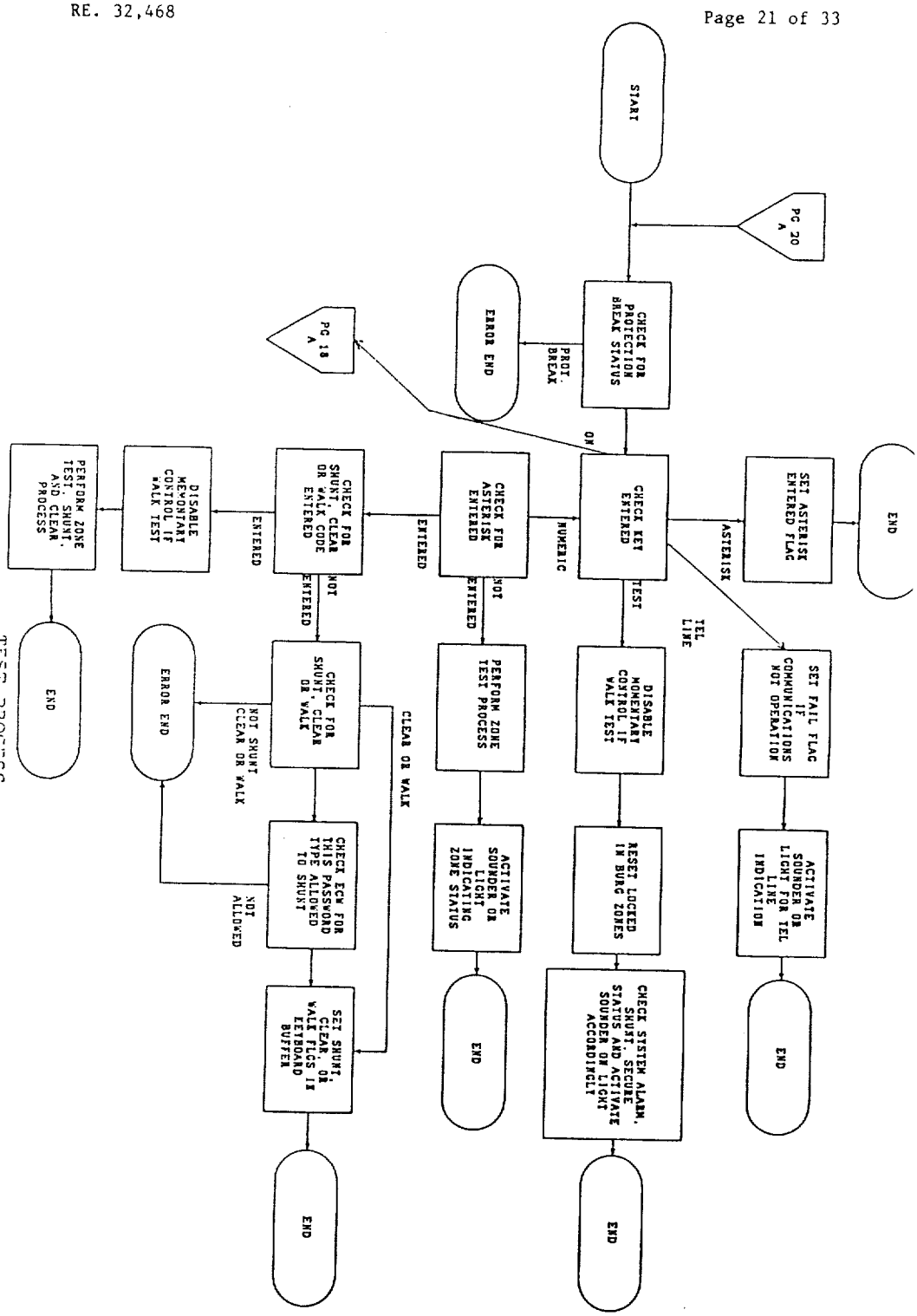
TEST PROCESS

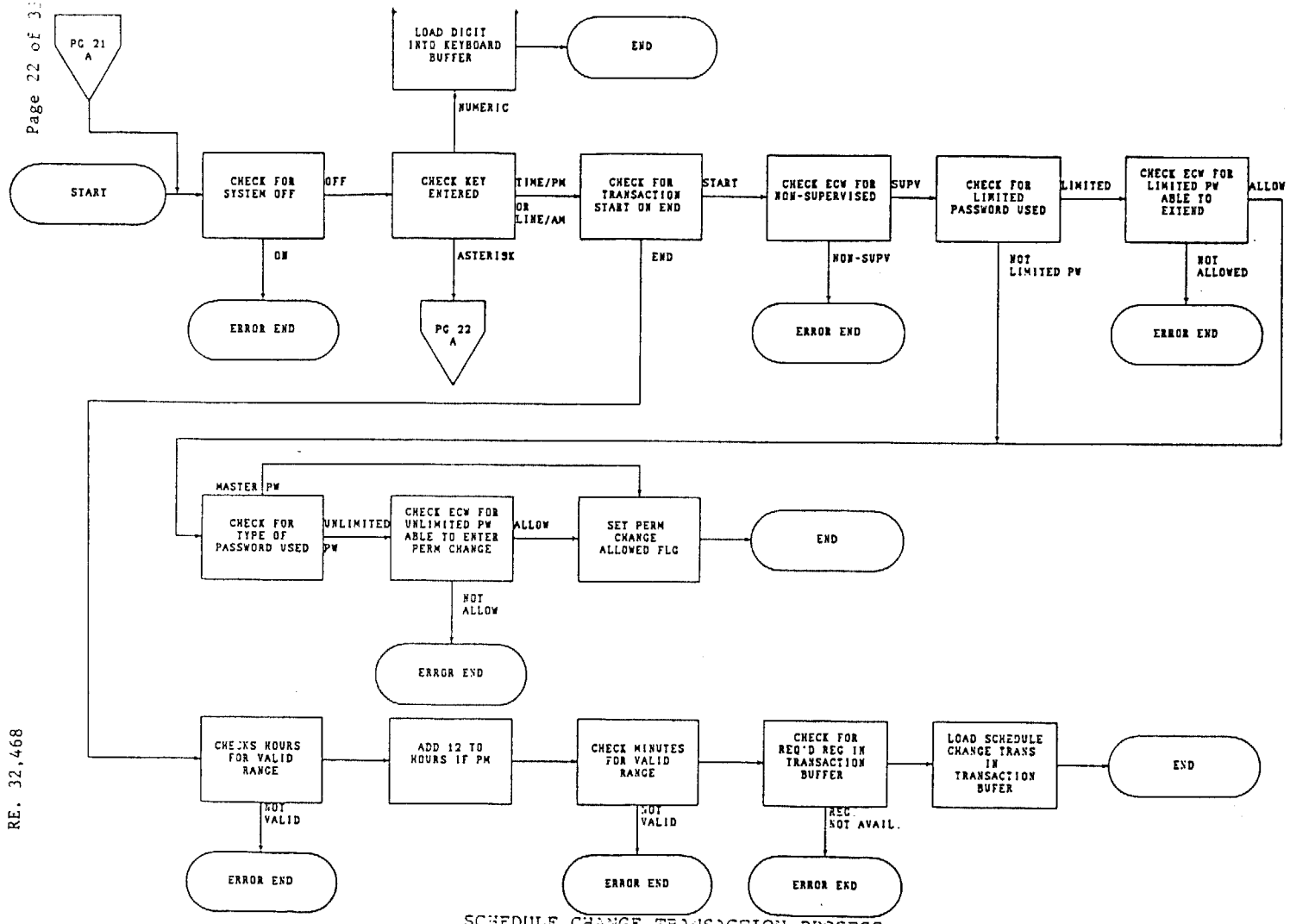
SCHEDULE CHANGE TRANSACTION PROCESS
APPENDIX A-21

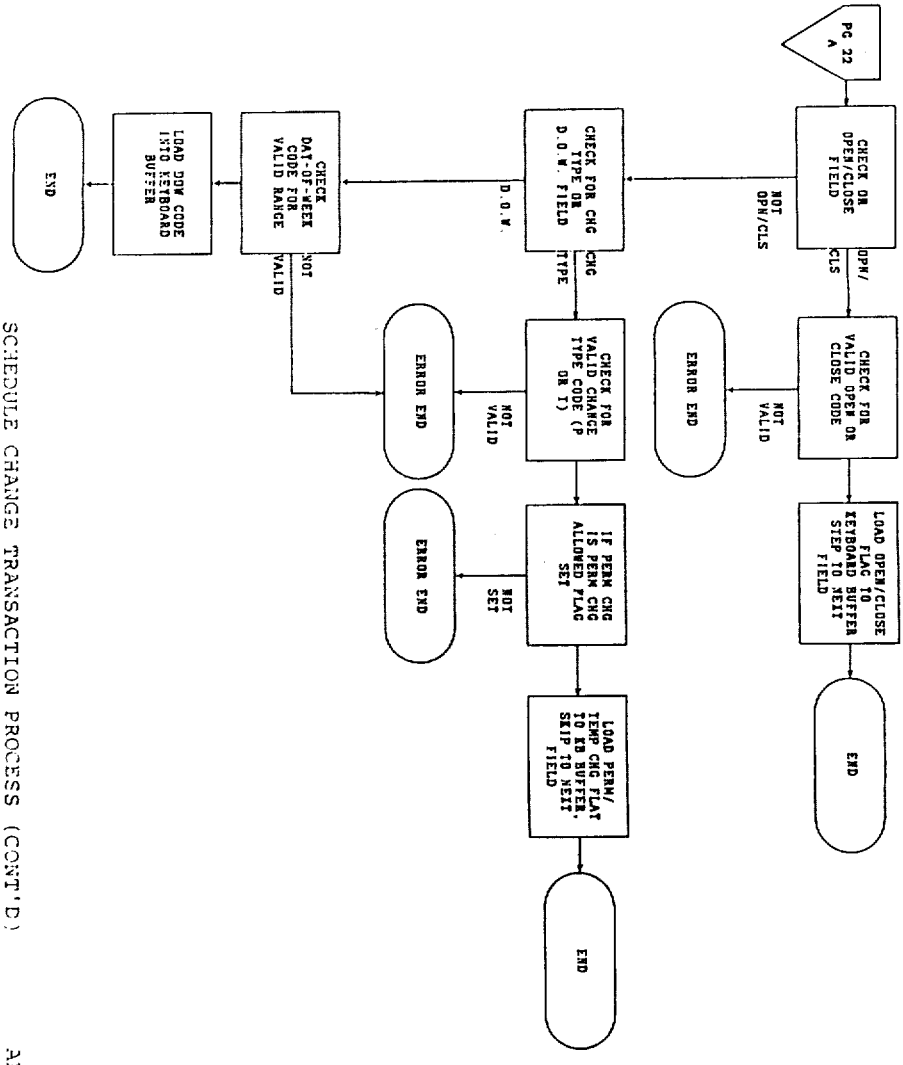
SCHEDULE CHANGE TRANSACTION PROCESS (CONT'D)

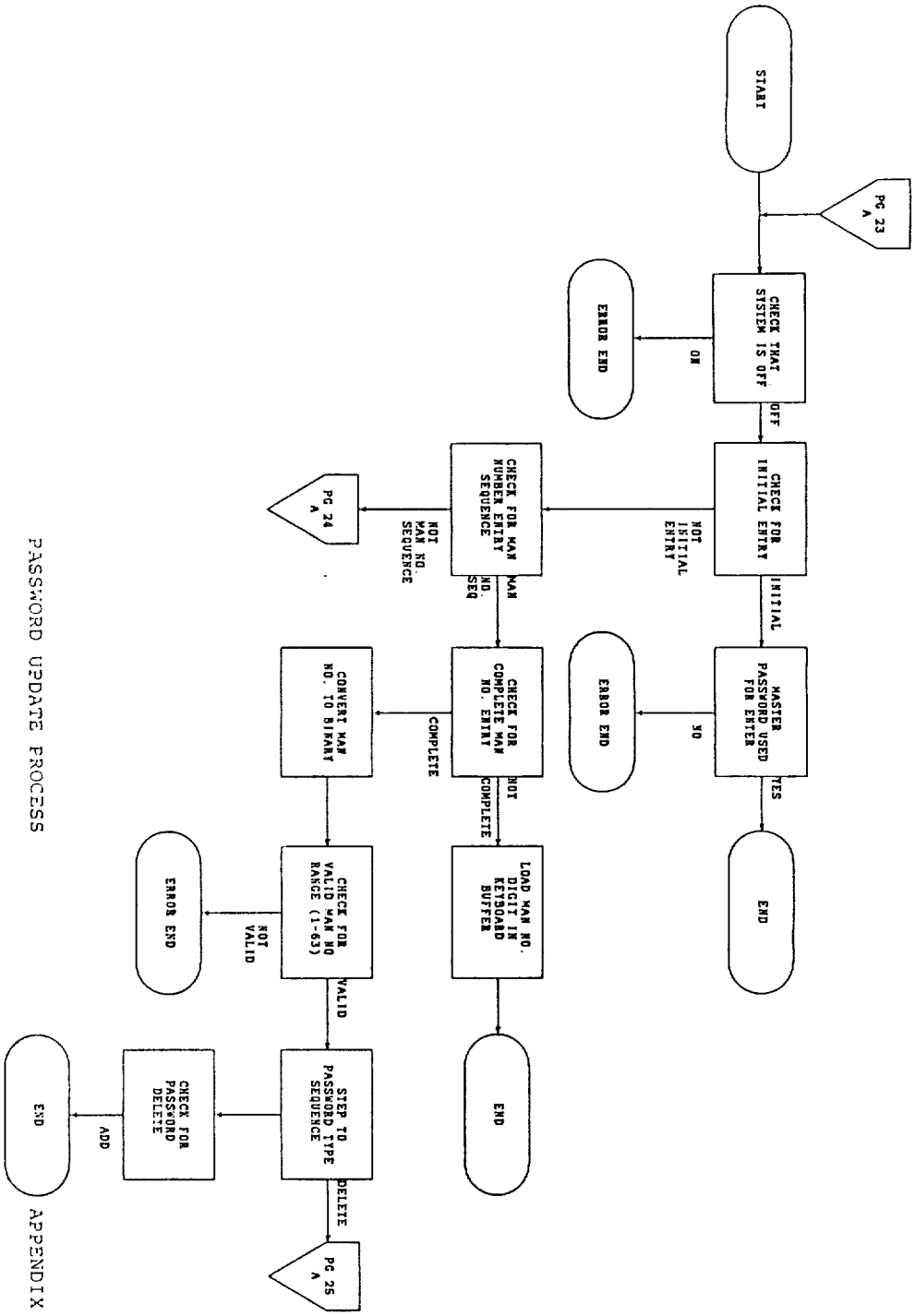
PASSWORD UPDATE PROCESS

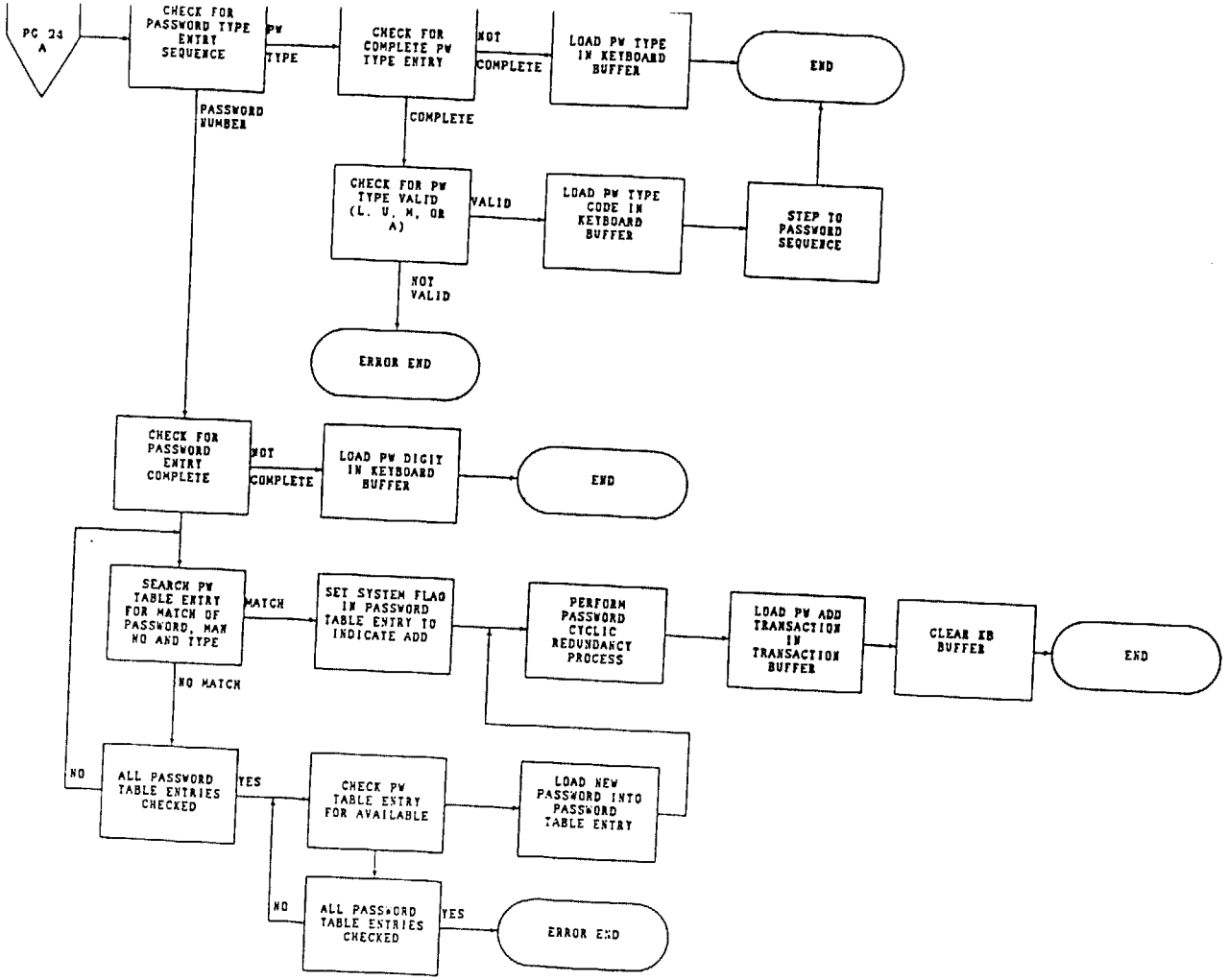
PASSWORD UPDATE PROCESS

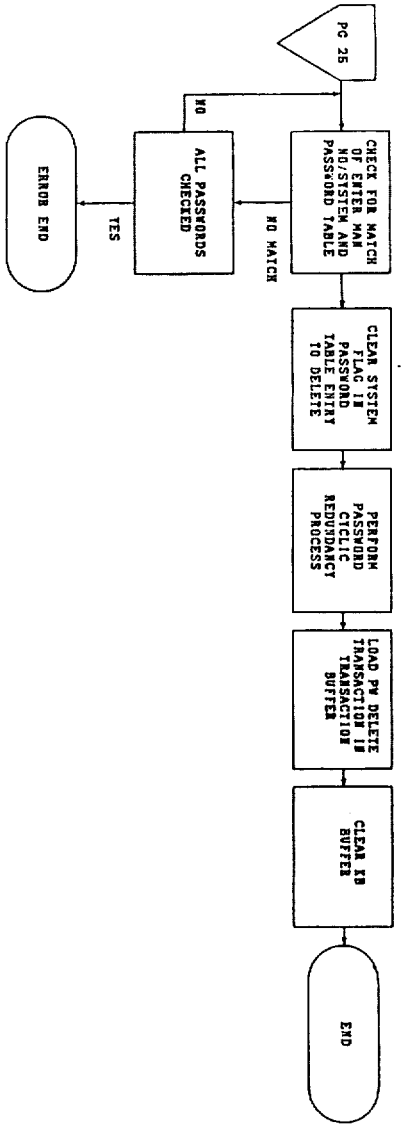
PASSWORD UPDATE PROCESS
APPENDIX A-25

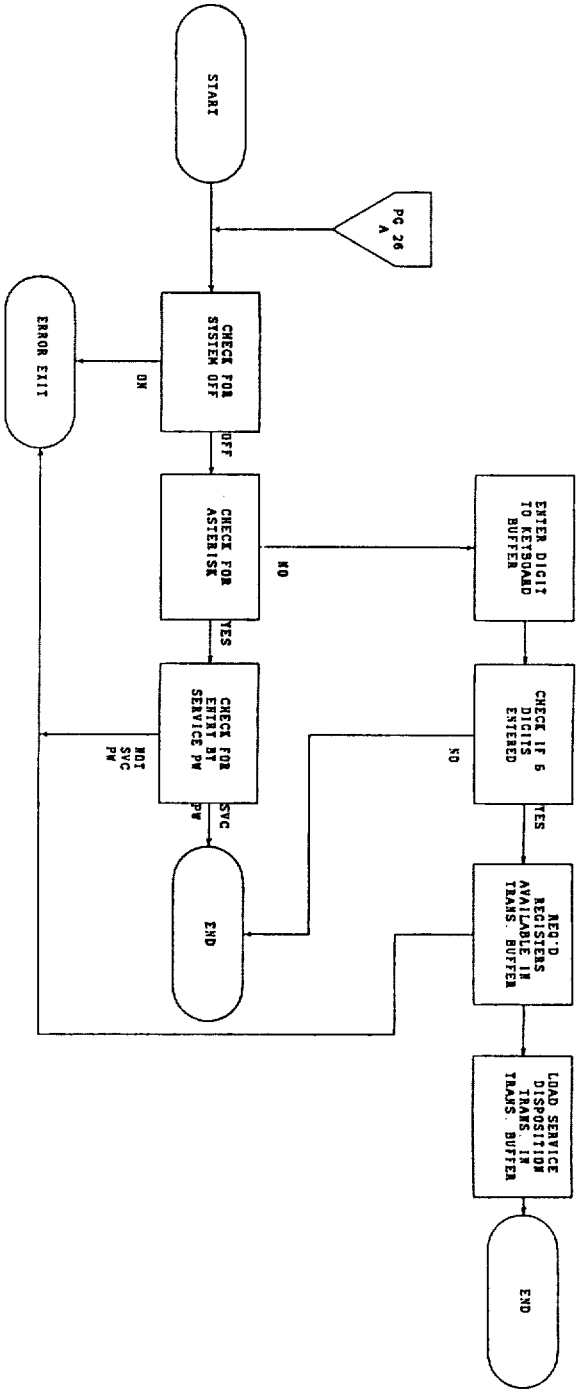
APPENDIX A-26

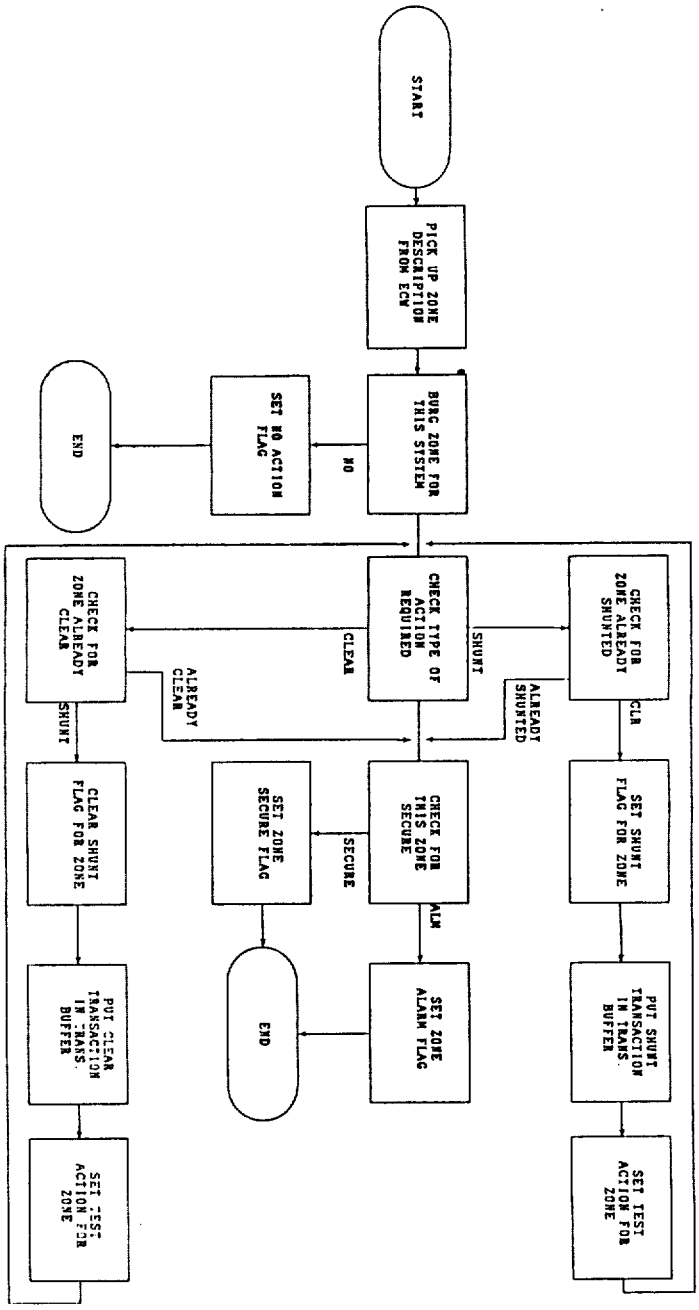
ZONE TEST/SHUNT/CLEAR PROCESS

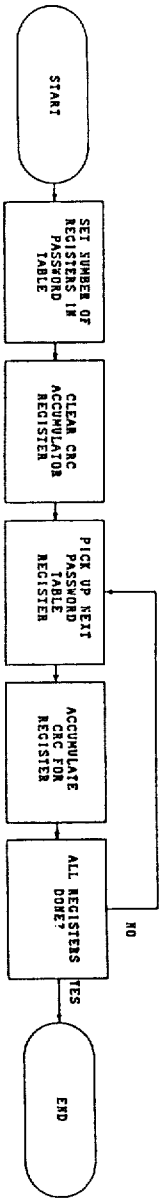
PASSWORD CYCLIC REDUNDANCY PROCESS
APPENDIX 38

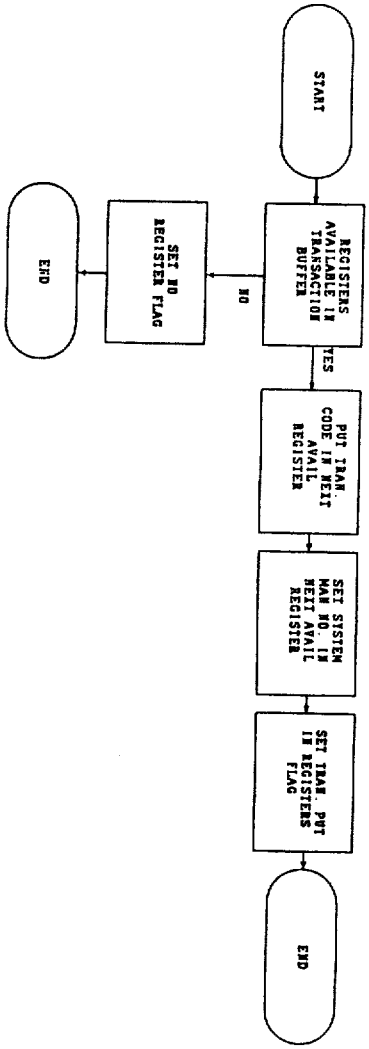
TRANSACTION OUTPUT PROCESS
APPENDIX A-29

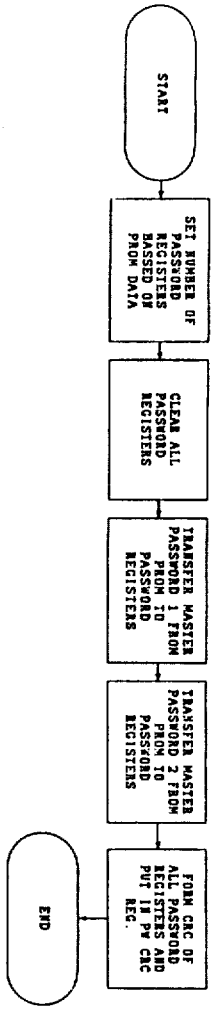
PASSWORD TABLE INITIALIZATION
APPENDIX A-30

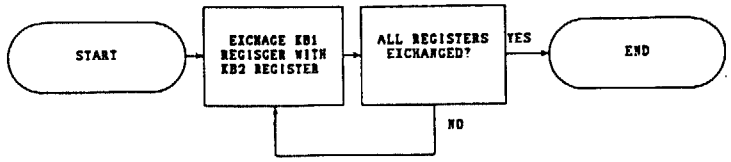
KEYBOARD BUFFER EXCHANGE PROCESS
APPENDIX A-31

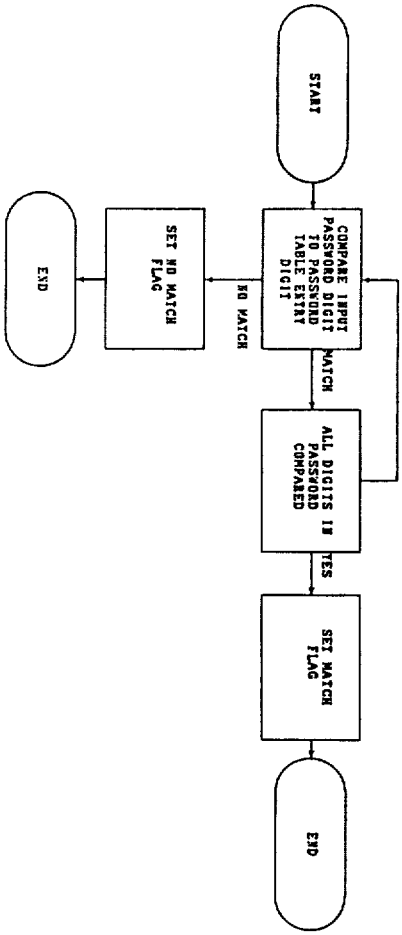
PASSWORD COMPARISON PROCESS
APPENDIX A-32